(12) United States Patent
Fukui

(10) Patent No.: US 8,418,956 B2
(45) Date of Patent: Apr. 16, 2013

(54) AIRCRAFT ACTUATOR HYDRAULIC SYSTEM

(75) Inventor: Atsushi Fukui, Gifu (JP)

(73) Assignee: Nabtesco Corporation (JP)

( * ) Notice: Subject to any disclaimer, the term of this patent is extended or adjusted under 35 U.S.C. 154(b) by 119 days.

(21) Appl. No.: 13/169,644

(22) Filed: Jun. 27, 2011

(65) Prior Publication Data
US 2012/0001021 A1    Jan. 5, 2012

(30) Foreign Application Priority Data
Jun. 30, 2010  (JP) ................................ 2010-148545

(51) Int. Cl.
*B64C 5/10*    (2006.01)
(52) U.S. Cl.
USPC ................... 244/99.6; 244/99.5; 244/99.2
(58) Field of Classification Search ............... 244/99.6, 244/99.5, 99.2, 213; 60/405, 592
See application file for complete search history.

(56) References Cited

U.S. PATENT DOCUMENTS

| | | | |
|---|---|---|---|
| 3,347,495 A * | 10/1967 | Eberhardt et al. | 244/207 |
| 5,109,672 A * | 5/1992 | Chenoweth et al. | 60/456 |
| 7,600,715 B2 * | 10/2009 | Matsui | 244/99.6 |
| 7,870,726 B2 * | 1/2011 | Matsui | 60/405 |
| 8,191,824 B2 * | 6/2012 | Shaheen et al. | 244/76 A |
| 2006/0226285 A1 * | 10/2006 | Matsui | 244/99.6 |
| 2009/0266934 A1 * | 10/2009 | Makino | 244/99.5 |
| 2011/0051127 A1 * | 3/2011 | Kusaka et al. | 356/128 |
| 2011/0068221 A1 * | 3/2011 | Recksiek et al. | 244/99.5 |
| 2011/0256000 A1 * | 10/2011 | Fukui | 417/213 |
| 2011/0264242 A1 * | 10/2011 | Nakagawa et al. | 700/21 |
| 2011/0266390 A1 * | 11/2011 | Nakagawa et al. | 244/99.5 |
| 2011/0278392 A1 * | 11/2011 | Fukui | 244/99.6 |
| 2011/0290353 A1 * | 12/2011 | Fukui et al. | 137/565.11 |
| 2012/0029859 A1 * | 2/2012 | Fukui et al. | 702/114 |
| 2012/0085860 A1 * | 4/2012 | Nakagawa et al. | 244/99.4 |
| 2012/0131912 A1 * | 5/2012 | Fukui et al. | 60/405 |

FOREIGN PATENT DOCUMENTS
JP    2007-046790 A    2/2007

\* cited by examiner

*Primary Examiner* — Timothy D Collins
*Assistant Examiner* — Medhat Badawi
(74) *Attorney, Agent, or Firm* — Studebaker & Brackett PC; Donald R. Studebaker

(57) ABSTRACT

When a loss or degradation in the function of one of a first aircraft central hydraulic power source and a second aircraft central hydraulic power source occurs, a controller performs a control so as to operate the other backup hydraulic pump, out of a first backup hydraulic pump and a second backup hydraulic pump, which is connected downstream of the other hydraulic power source, which is the other of the first and second aircraft central hydraulic power sources. Oil flowing through the other backup hydraulic pump is cooled by an oil cooler of the other hydraulic power source by operation of the other backup hydraulic pump in a state where the other hydraulic power source is being operated.

3 Claims, 8 Drawing Sheets

AIRCRAFT ACTUATOR HYDRAULIC SYSTEM

CROSS-REFERENCE TO RELATED APPLICATIONS

This application claims priority to Japanese Patent Application No. 2010-148545. The entire disclosure of Japanese Patent Application No. 2010-148545 is hereby incorporated herein by reference.

BACKGROUND OF THE INVENTION

1. Field of the Invention

The present invention relates to an aircraft actuator hydraulic system that includes hydraulically operated actuators for driving a control surface of an aircraft and that supplies pressure oil to the actuators.

2. Description of Related Art

An aircraft is provided with control surfaces that are formed as moving surfaces (flight control surfaces) and are configured as an aileron, an elevator, a rudder and the like. A hydraulically operated actuator is often used as an actuator for driving such control surfaces. Further, pressure oil is supplied to such an actuator from an aircraft central hydraulic power source. However, a loss or degradation in the function (pressure oil supply function) of the aircraft central hydraulic power source may occur. To address this problem, JP 2007-46790A discloses a hydraulic system (aircraft actuator hydraulic system) that can supply pressure oil to an actuator even if a loss or degradation in the function of the aircraft central hydraulic power source occurs.

The aircraft actuator hydraulic system that is disclosed in JP 2007-46790A includes an actuator, a pump that is provided independently of the aircraft central hydraulic power source, and an electric motor. The pump is provided so as to raise the pressure of pressure oil that is discharged from the actuator and to supply the pressure oil to the actuator. The electric motor is configured to drive the pump when the aircraft central hydraulic power source undergoes a pressure decrease and a loss or degradation in its function occurs.

SUMMARY OF THE INVENTION

Even if a loss or degradation in the function of the aircraft central hydraulic power source of the aircraft occurs, the actuator can be driven by operating the pump of an aircraft actuator hydraulic system as disclosed in JP 2007-46790A. However, in the case of a loss or degradation in the function of the aircraft central hydraulic power source, the pump and the electric motor for driving the pump described above are continuously driven, and thus the hydraulic system is continuously running. This tends to cause an increase in the overall temperature of the hydraulic system, and also tends to cause an increase in the temperature of the oil (working fluid) that is supplied as the pressure oil from the pump to the actuator and that is circulated between the pump and the actuator. Accordingly, there is a significant constraint on the continuous running time and the time for oil replacement associated with oil degradation. Note that it is conceivable to add an oil cooler for cooling oil to the hydraulic system that functions in the case of a loss or degradation in the function of the aircraft central hydraulic power source. However, this may lead to an increase in the size and the weight of the hydraulic system.

In view of the foregoing circumstances, it is an object of the present invention to provide an aircraft actuator hydraulic system that can drive actuators even in the case of a loss or degradation in the function of the aircraft central hydraulic power source, can prevent an increase in the size and the weight of the system, and can suppress an increase in the overall temperature of the system and the temperature of the oil used.

According to a first feature of an aircraft actuator hydraulic system of the present invention for achieving the above-described object, there is provided an aircraft actuator hydraulic system that includes hydraulically operated actuators for driving control surfaces of an aircraft and that supplies pressure oil to the actuators, the system including: a first actuator that is provided as one of the actuators and that drives a first control surface provided as one of the control surfaces by being operated by supply of pressure oil from a first aircraft central hydraulic power source with an oil cooler; a second actuator that is provided as another one of the actuators and that drives a second control surface provided as another one of the control surfaces and provided so as to operate in pairs with the first control surface or that drives the first control surface by being operated by supply of pressure oil from a second aircraft central hydraulic power source with an oil cooler; a first backup hydraulic pump that can supply pressure oil to the first actuator when a loss or degradation in a function of the first aircraft central hydraulic power source occurs; a second backup hydraulic pump that can supply pressure oil to the second actuator when a loss or degradation in a function of the second aircraft central hydraulic power source occurs; and a controller that, when a loss or degradation in the function of one of the first aircraft central hydraulic power source and the second aircraft central hydraulic power source occurs, performs a control so as to operate the other backup hydraulic pump, out of the first backup hydraulic pump and the second backup hydraulic pump, which is connected downstream of the other hydraulic power source, which is the other of the first aircraft central hydraulic power source and the second aircraft central hydraulic power source, wherein oil flowing through the other backup hydraulic pump and the other hydraulic power source is cooled by the oil cooler of the other hydraulic power source by operation of the other backup hydraulic pump under control of the controller in a state where the other hydraulic power source is being operated.

Note that the aircraft actuator hydraulic system having the first feature is configured such that the first backup hydraulic pump is not operated (pressure oil is not supplied from the first backup hydraulic pump to the first actuator) when a loss in the function of the first actuator occurs and the second backup hydraulic pump is not operated (pressure oil is not supplied from the second backup hydraulic pump to the second actuator) when a loss in the function of the second actuator occurs.

With this configuration, even if a loss or degradation in the function of the first aircraft central hydraulic power source occurs after a loss or degradation in the function of the second aircraft central hydraulic power source occurred, the first actuator can be driven by supply of the pressure oil from the first backup hydraulic pump. Also, even if a loss or degradation in the function of the second aircraft central hydraulic power source occurs after a loss or degradation in the function of the first aircraft central hydraulic power source occurred, the second actuator can be driven by supply of the pressure oil from the second backup hydraulic pump.

Furthermore, with this configuration, when a loss or degradation in the function of one of the first and second aircraft central hydraulic power sources occurs, the other backup hydraulic pump, which is connected downstream of the other of the first and second aircraft central hydraulic power sources (i.e., the other hydraulic power source, in which a loss or degradation in the function has not occurred) is operated under control of the controller. The oil flowing through the other backup hydraulic pump and the other hydraulic power source is cooled by the oil cooler of the other hydraulic power source by operation of the other backup hydraulic pump in a state where the other hydraulic power source is being operated. Therefore, even if the other backup hydraulic pump, which is operated when a loss or degradation in the function of one of the first and second aircraft central hydraulic power sources occurs, is continuously operated, it is possible to cool the oil (working fluid) that is supplied as the pressure oil from the other backup hydraulic pump to the actuator and is circulated between that pump and the actuator. Then, it is possible to cool the other backup hydraulic pump in operation, and also cool the electric motor that is coupled to the other backup hydraulic pump and in which heat conduction occurs, thus making it possible to suppress an increase in the overall temperature of the hydraulic system. Furthermore, with this configuration, it is possible to continuously maintain the control of the aircraft body by the backup hydraulic pump that has already been activated even if a loss in the function of the remaining aircraft central hydraulic power source (i.e., even if a loss or degradation in the function also occurs in the aircraft central hydraulic power source in which a loss or degradation in the function has not occurred) occurs, while suppressing the temperature increase.

When a loss or degradation in the function of one of the first and second aircraft central hydraulic power sources occurs, if the backup hydraulic pump connected downstream of the aircraft central hydraulic power source in which a loss or degradation in the function occurs, it becomes difficult to control the temperature increase of that backup hydraulic pump and the oil used. However, with this configuration, as described above, it is possible to effectively utilize the oil coolers of the aircraft central hydraulic power sources, thus suppressing an increase in the temperature of the backup hydraulic pumps and the oil used. With this configuration, an oil cooler for cooling oil will not be further added to the hydraulic system, which functions in the case of a loss or degradation of the function of the aircraft central hydraulic power sources, and therefore there will be no increase in the size and the weight of the hydraulic system.

Therefore, with this configuration, it is possible to provide an aircraft actuator hydraulic system that can drive the actuators even in the case of a loss or degradation in the function of the aircraft central hydraulic power sources and can prevent an increase in the size and the weight of the system, thus suppressing an increase in the overall temperature of the system and the temperature of the oil used.

According to a second feature of an aircraft actuator hydraulic system of the present invention, the aircraft actuator hydraulic system having the first feature further includes: a first backup-side check valve that permits an oil flow in a direction from the first backup hydraulic pump to the first actuator and prevents an oil flow in the opposite direction; a first aircraft central hydraulic power source-side check valve that permits an oil flow in a direction from the first aircraft central hydraulic power source to the first actuator and prevents an oil flow in the opposite direction; a second backup-side check valve that permits an oil flow in a direction from the second backup hydraulic pump to the second actuator and prevents an oil flow in the opposite direction; a second aircraft central hydraulic power source-side check valve that permits an oil flow in a direction from the second aircraft central hydraulic power source to the second actuator and prevents an oil flow in the opposite direction; a first bypass path that bypasses the first aircraft central hydraulic power source-side check valve and enables circulation of oil from the first backup hydraulic pump to the oil cooler of the first aircraft central hydraulic power source; a second bypass path that bypasses the second aircraft central hydraulic power source-side check valve and enables circulation of oil from the second backup hydraulic pump to the oil cooler of the second aircraft central hydraulic power source; a first switching valve that can switch a state of the first bypass path to one of a communicating state and an interrupted state; and a second switching valve that can switch a state of the second bypass path to one of a communicating state and an interrupted state, wherein the controller causes the first backup hydraulic pump and the second backup hydraulic pump to operate and controls the first switching valve so as to switch the state of the first bypass path to the communicating state, when a loss or degradation in the function of the first aircraft central hydraulic power source occurs and a loss or degradation in the function of the second aircraft central hydraulic power source occurs in a state where oil can be circulated in the first aircraft central hydraulic power source; and causes the first backup hydraulic pump and the second backup hydraulic pump to operate and controls the second switching valve so as to switch the state of the second bypass path to the communicating state, when a loss or degradation in the function of the first aircraft central hydraulic power source occurs and a loss or degradation in the function of the second aircraft central hydraulic power source occurs in a state where oil can be circulated in the second aircraft central hydraulic power source.

With this configuration, the provision of the first backup-side check valve and the first aircraft central hydraulic power source-side check valve prevents a backflow of the pressure oil from the first backup hydraulic pump to the first aircraft central hydraulic power source and a backflow of the pressure oil from the first aircraft central hydraulic power source to the first backup hydraulic pump during operation of the first backup hydraulic pump and the first aircraft central hydraulic power source. Also, the provision of the second backup-side check valve and the second aircraft central hydraulic power source-side check valve prevents a backflow of the pressure oil from the second backup hydraulic pump to the second aircraft central hydraulic power source and a backflow of the pressure oil from the second aircraft central hydraulic power source to the second backup hydraulic pump during operation of the second backup hydraulic pump and the second aircraft central hydraulic power source.

Moreover, with this configuration, the first and second actuators are driven by operation of the first and second backup hydraulic pumps when a loss or degradation in the function of the first and second aircraft central hydraulic power sources occurs. Also, if the oil can be circulated in the first aircraft central hydraulic power source in the case of a loss or degradation in the function of the first and second aircraft central hydraulic power sources, the controller controls the first switching valve provided in the first bypass path so as to switch the state of the first bypass path that bypasses the first aircraft central hydraulic power source-side check valve to the communicating state. Consequently, the oil supplied from the first backup hydraulic pump is cooled by being circulated also in the oil cooler of the first aircraft central hydraulic power source. Further, if the oil can be circulated in the second aircraft central hydraulic power source in the case of a loss or degradation in the function of the first and second aircraft central hydraulic power sources, the controller controls the second switching valve provided in the second bypass path so as to switch the sate of the second bypass path that bypasses the second aircraft central hydraulic power source-side check valve to the communicating state. Consequently, the oil supplied from the second backup hydraulic pump is cooled by being circulated also in the oil cooler of the second aircraft central hydraulic power source. Accordingly, it is possible to drive the first and second actuators even in the case of a loss or degradation in the function of both of the first and second aircraft central hydraulic power sources and effectively utilize the oil coolers of the aircraft central hydraulic power sources, thus suppressing an increase in the temperature of the backup hydraulic pumps and the temperature of the oil used.

According to a third feature of an aircraft actuator hydraulic system of the present invention, in the aircraft actuator hydraulic system having the first feature, the first backup hydraulic pump and a first electric motor that drives the first backup hydraulic pump are installed inside a first wing provided with the first control surface, the second backup hydraulic pump and a second electric motor that drives the second backup hydraulic pump are installed inside a second wing provided with the second control surface driven by the second actuator, the hydraulic system further includes: an inlet port that is provided as a hole formed through at least one of a first wing structure portion constituting a surface structure of the first wing and a second wing structure portion constituting a surface structure of the second wing, and that can supply air outside the first wing and the second wing into at least one of the first wing and the second wing; an exhaust port that is provided as a hole formed through at least one of the first wing structure portion and the second wing structure portion in which the inlet port is provided, and that can discharge air inside at least one of the first wing and the second wing to the outside; an inlet port opening/closing portion that is provided in at least one of the first wing structure portion and the second wing structure portion in which the inlet port is provided, whose position can be switched between a position to open the inside of at least one of the first wing and the second wing to the outside and a position to close the inside of at least one of the first wing and the second wing from the outside, and that can open and close the inlet port; an exhaust port opening/closing portion that is provided in at least one of the first wing structure portion and the second wing structure portion in which the exhaust port is provided, whose position can be switched between a position to open the inside of at least one of the first wing and the second wing to the outside and a position to close the inside of at least one of the first wing and the second wing from the outside, and that can open and close the exhaust port; an inlet-side drive mechanism that drives the inlet port opening/closing portion to be opened and closed; and an exhaust-side drive mechanism that drives the exhaust port opening/closing portion to be opened and closed, wherein the inlet-side drive mechanism and the exhaust-side drive mechanism operate in accordance with a command signal from the controller, and the controller causes the inlet-side drive mechanism and the exhaust-side drive mechanism to operate so as to open the inlet port and the exhaust port when activating both of the first backup hydraulic pump and the second backup hydraulic pump.

With this configuration, the first backup hydraulic pump and the first electric motor are installed inside the first wing, and the second backup hydraulic pump and the second electric motor are installed inside the second wing. Accordingly, the aircraft actuator hydraulic system is installed in a region close to the actuators, making it possible to realize a further reduction in the size and the weight of the hydraulic system. Moreover, the hydraulic system having this configuration is configured such that the inlet port opening/closing portion and the exhaust port opening/closing portion operate to open the inlet port and the exhaust port, thus making it possible to supply the low-temperature air outside the first wing and the second wing into at least one of the first wing and the second wing and discharge the high-temperature air inside at least one of the first wing and the second wing to the outside of that wing. Accordingly, the heat generated from at least one of the first and second backup hydraulic pumps and at least one of the first and second electric motors of the hydraulic system can be removed by the air flowing in from the inlet port to the exhaust port, thereby cooling the hydraulic system. That is, the heat generated in the hydraulic system can be released directly to the atmosphere outside the wings. With the hydraulic system having this configuration, the inlet port and the exhaust port are opened if both of the first and second backup hydraulic pumps are activated when a loss or degradation in the function of both of the first and second aircraft central hydraulic power sources occurs. Therefore, even in such a case where the oil coolers of the aircraft central hydraulic power sources cannot be used when a loss or degradation in the function of both of the first and second aircraft central hydraulic power sources occurs, it is possible to suppress an increase in the overall temperature of the hydraulic system and an increase in the temperature of the oil used. Furthermore, with the hydraulic system having this configuration, the inlet-side drive mechanism that drives the inlet port opening/closing portion to be opened and closed and the exhaust-side drive mechanism that drives the exhaust port opening/closing portion to be opened and closed operate in accordance with a command signal from the controller that controls the operation of the first and second backup hydraulic pumps. Accordingly, it is possible, by effectively utilizing the controller that controls the operation of the first and second backup hydraulic pumps, to achieve a control configuration that can open the inlet port and the exhaust port in response to the operation status of the first and second backup hydraulic pumps, without adding an extra control apparatus.

It should be appreciated that the above and other objects, and features and advantages of the present invention will become apparent from the following description taken in conjunction with the accompanying drawings.

DETAILED DESCRIPTION OF THE INVENTION

Hereinafter, embodiments for carrying out the present invention will be described with reference to the accompanying drawings. It should be appreciated that embodiments of the present invention can be widely applied as an aircraft actuator hydraulic system that includes hydraulically operated actuators for driving a control surface of an aircraft and that supplies pressure oil to the actuators.

First Embodiment

Figure 1:
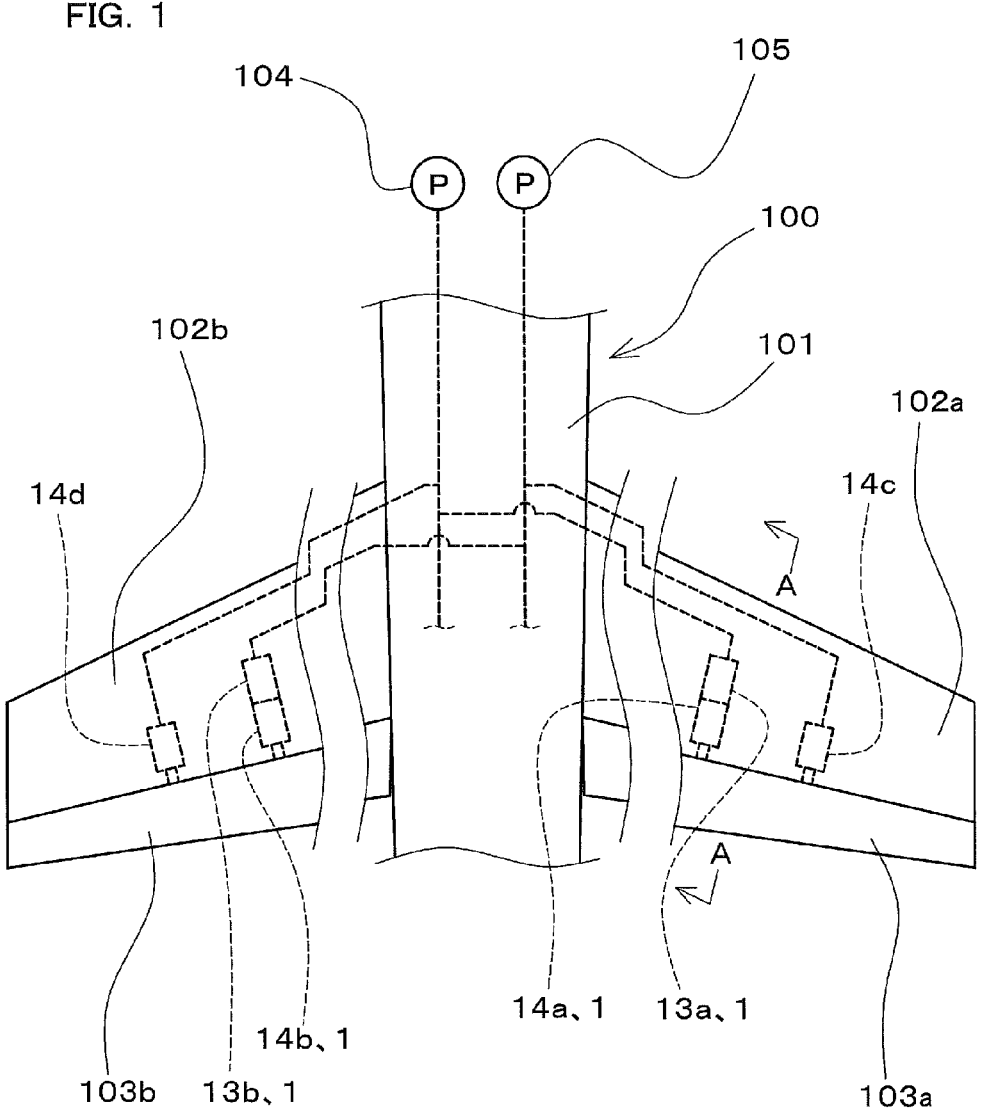
FIG. 1 is a diagram schematically showing part of an aircraft to which an aircraft actuator hydraulic system according to a first embodiment of the present invention is applied.

FIG. 1 is a diagram schematically showing part of an aircraft 100 to which a hydraulic system 1 for aircraft actuators (hereinafter, also simply referred to as a "hydraulic system 1") according to a first embodiment of the present invention is applied, showing part of a fuselage portion of a body 101 of the aircraft 100 and a pair of main wings (102a, 102b). In FIG. 1, the illustration of the intermediate portions of the main wings (102a, 102b) is omitted.

The main wing 102a is provided with an aileron 103a as a moving surface (flight control surface) constituting a control surface of the aircraft 100. Likewise, the main wing 102b is provided with an aileron 103b as a moving surface (flight control surface) constituting a control surface of the aircraft 100. As illustrated in FIG. 1, the aileron 103a of the main wing 102a is configured to be driven by a plurality of (for example, two) actuators (14a, 14c). The aileron 103b of the main wing 102b is also configured to be driven by a plurality of (for example, two) actuators (14b, 14d). The actuators (14a, 14c) for driving the aileron 103a and the hydraulic apparatus 13a configured to supply pressure oil to one of the actuators, namely the actuator 14a, are installed inside the main wing 102a. On the other hand, the actuators (14b, 14d) for driving the aileron 103b and the hydraulic apparatus 13b configured to supply pressure oil to one of the actuators, namely the actuator 14b, are installed inside the main wing 102b.

Note that the hydraulic system 1 according to this embodiment includes the actuator 14a, the actuator 14b, the hydraulic apparatus 13a, the hydraulic apparatus 13b, a flight controller 12a and a flight controller 12b, which will be described below, and so forth.

In this embodiment, the actuators (14a, 14b, 14c, 14d) and the hydraulic apparatuses (13a, 13b) that are respectively installed in the pair of the main wings (102a, 102b) are configured in the same manner. Therefore, in the following description, the actuators (14a, 14c) and the hydraulic apparatus 13a that are installed in one of the main wings, namely, the main wing 102a, will be described. The description of the actuators (14b, 14d) and the hydraulic apparatus 13b installed in the other of the main wings, namely, the main wing 102b, is omitted where appropriate.

Figure 2:
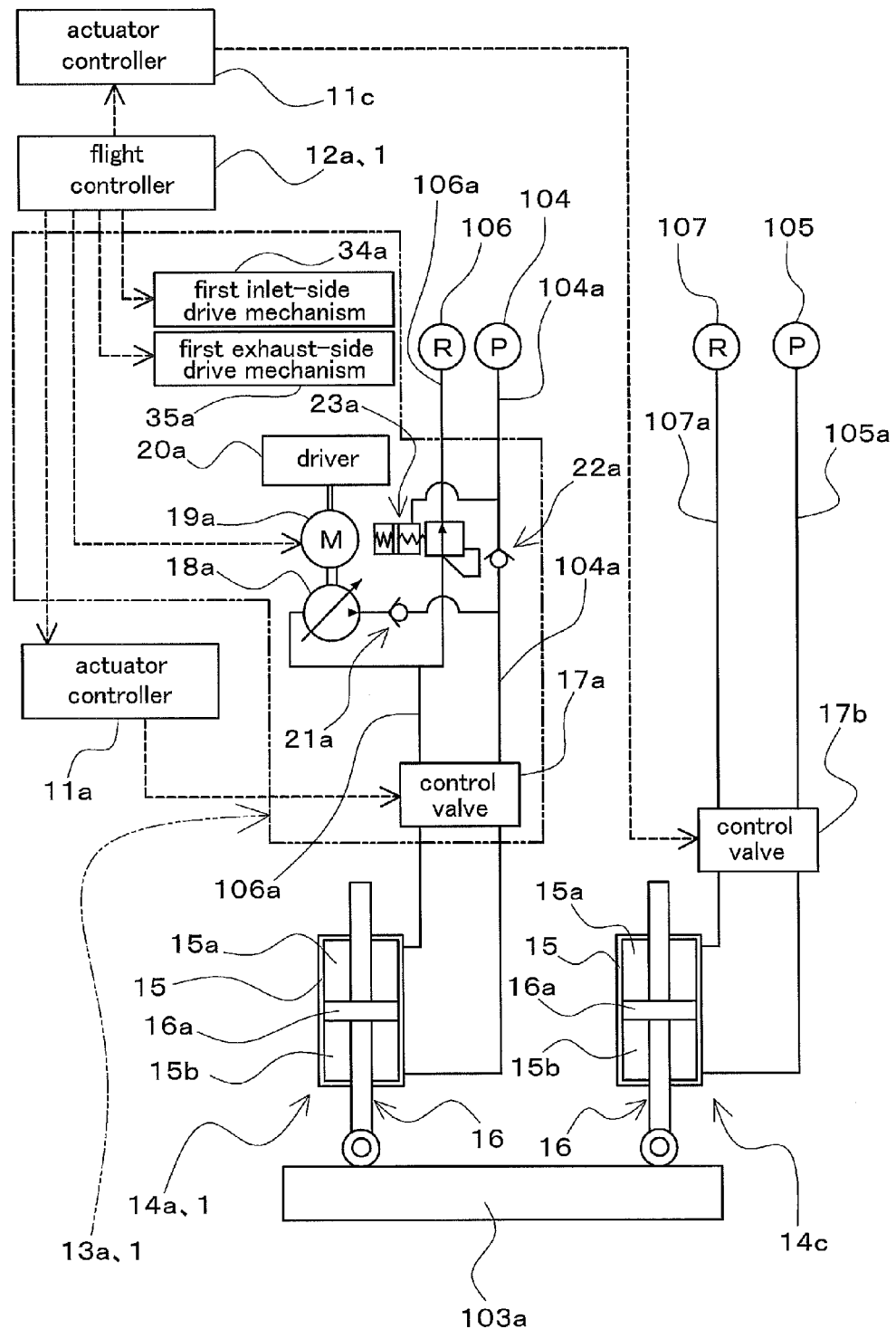
FIG. 2 is a hydraulic circuit diagram schematically showing a hydraulic circuit including part of the hydraulic system shown in FIG. 1.
Figure 3:
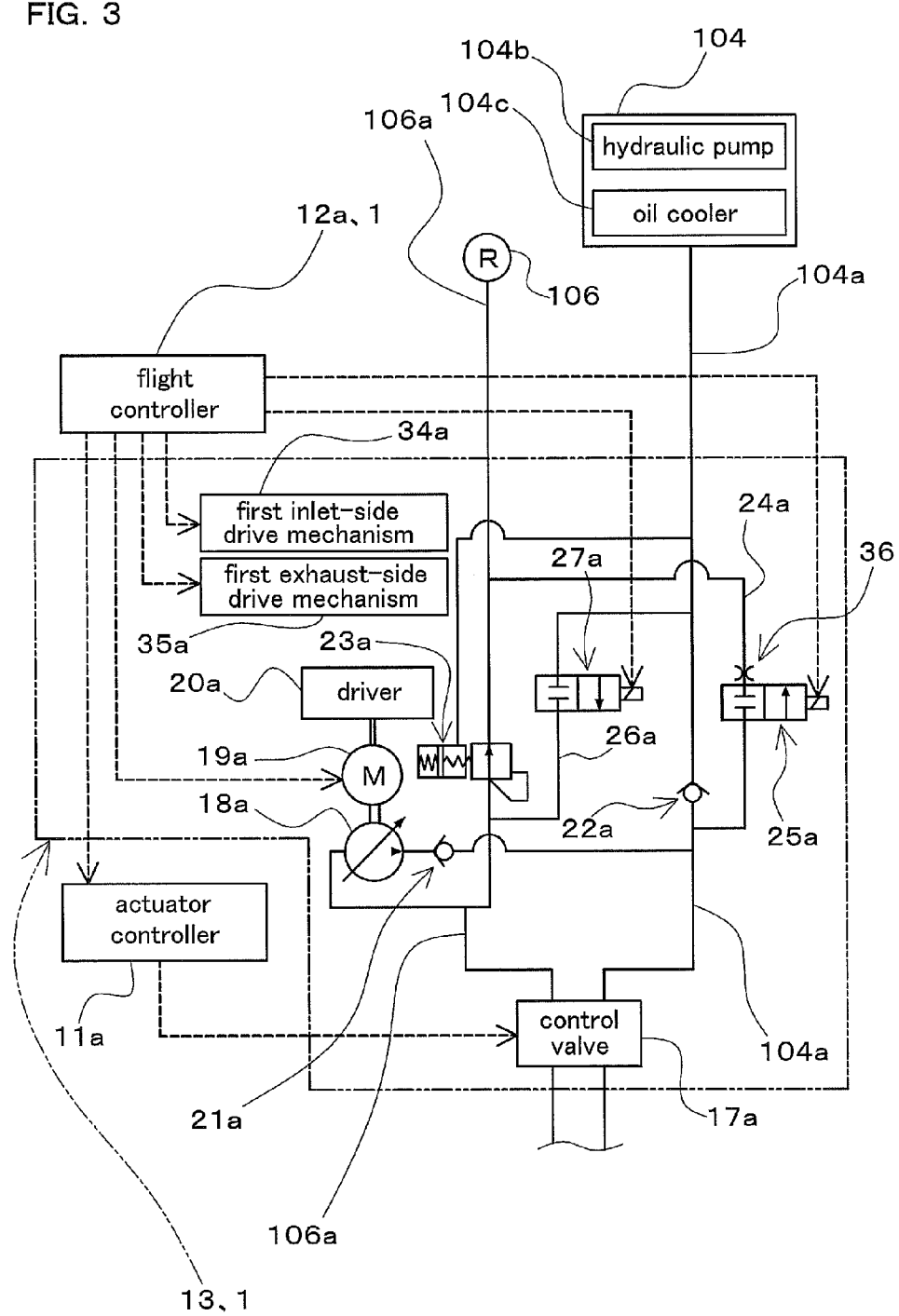
FIG. 3 is a diagram showing part of the hydraulic circuit diagram shown in FIG. 2 in further detail.

FIG. 2 is a hydraulic circuit diagram schematically showing a hydraulic circuit including part of the hydraulic system 1. FIG. 3 is a diagram showing part of the hydraulic circuit diagram shown in FIG. 2 in further detail. Note that FIG. 2 is shown as a hydraulic circuit diagram schematically showing a hydraulic circuit including the actuators (14a, 14c) for driving the aileron 103a provided in one of the main wings (102a) and the hydraulic apparatus 13a configured to supply pressure oil to one of the actuators (14a). FIG. 3 shows, in further detail, the configuration of the hydraulic circuit of the hydraulic apparatus 13a shown in FIG. 2 and the configuration of a first aircraft central hydraulic power source 104, which will be described below.

As shown in FIG. 2, each of the actuators (14a, 14c) includes, for example, a cylinder 15 and a rod 16 provided with a piston 16a, with the interior of the cylinder 15 divided into two oil chambers (15a, 15b) by the piston 16a. Each of the oil chambers (15a, 15b) in the cylinder 15 of the actuator 14a is configured to be in communication with the first aircraft central hydraulic power source 104, which will be described below, and a reservoir circuit 106 via a control valve 17a included in the hydraulic apparatus 13a, which will be described below. On the other hand, each of the oil chambers (15a, 15b) in the cylinder 15 of the actuator 14c is configured to be in communication with a second aircraft central hydraulic power source 105, which will be described below, and a reservoir circuit 107 via a control valve 17b.

The first aircraft central hydraulic power source 104 shown in FIGS. 1 to 3 includes a hydraulic pump 104b that supplies pressure oil, an oil cooler 104c that includes a heat exchanger for cooling oil passing therethrough and that cools pressure oil supplied from the hydraulic pump 104b, and so forth. The first aircraft central hydraulic power source 104 is provided as a first hydraulic power source installed on the body 101 side (inside the body 101). Further, the second aircraft central hydraulic power source 105 shown in FIGS. 1 and 2 also includes a hydraulic pump (not shown) that supplies pressure oil, an oil cooler (not shown) that includes a heat exchanger for cooling oil passing therethrough and that cools pressure oil supplied from the hydraulic pump, and so forth, as with the first aircraft central hydraulic power source 104. The second aircraft central hydraulic power source 105 is provided as a second hydraulic power source installed on the body 101 side (inside the body 101). Note that the first aircraft central hydraulic power source 104 and the second aircraft central hydraulic power source 105 are provided as systems that are independent of each other.

By supplying the pressure oil from the first and second aircraft central hydraulic power sources (104, 105), the actuators (14a, 14b, 14c, 14d) for driving the ailerons (103a, 103b) and actuators (not shown) for driving control surfaces other than the ailerons (103a, 103b) are operated. Further, the first aircraft central hydraulic power source 104 is connected with the actuators 14a and 14d so as to be able to supply pressure oil to the actuator 14a installed in one of the main wings (102a) and the actuator 14d installed in the other main wing 102b. On the other hand, the second aircraft central hydraulic power source 105 is connected with the actuators 14c and 14b so as to be able to supply pressure oil to the actuator 14c installed in one of the main wings (102a) and the actuator 14b installed in the other main wing 102b.

The reservoir circuit 106 shown in FIGS. 2 and 3 includes a tank (not shown) into which oil (working fluid) that is supplied as pressure oil and is thereafter discharged from the actuators (14a, 14d) flows back, and the reservoir circuit 106 is configured to be in communication with the first aircraft central hydraulic power source 104. The reservoir circuit 107 (see FIG. 2) that is configured as a system independent of the reservoir circuit 106 includes a tank (not shown) into which oil (working fluid) that is supplied as pressure oil and is thereafter discharged from the actuators (14b, 14c) flows back, and the reservoir circuit 107 is configured to be in communication with the second aircraft central hydraulic power source 105 that is configured as a system independent of the first aircraft central hydraulic power source 104. Note that, as described above, the reservoir circuit 106 is connected with the actuator 14a installed in one of the main wings (102a) and the actuator 14d installed in the other main wing 102b, and is also connected with the first aircraft central hydraulic power source 104. Consequently, the pressure of the oil that has returned to the reservoir circuit 106 is raised by the first aircraft central hydraulic power source 104 and is supplied to the actuators (14a, 14c). On the other hand, the reservoir circuit 107 is connected with the actuator 14c installed in one of the main wings (102a) and the actuator 14b installed in the other main wing 102b, and is also connected with the second aircraft central hydraulic power source 105.

Consequently, the pressure of the oil that has returned to the reservoir circuit 107 is raised by the second aircraft central hydraulic power source 105 and is supplied to the actuators (14b, 14c).

Note that, as described above, the actuators (14a, 14b, 14c, 14d) are provided as hydraulically operated actuators for driving the ailerons (103a, 103b). In this embodiment, the aileron 103a provided in one of the main wings (102a) constitutes a first control surface, and the aileron 103b provided in the other main wing 102b constitutes a second control surface. Further, the actuator 14a constitutes a first actuator of this embodiment that is operated by supply of pressure oil from the first aircraft central hydraulic power source 104 and that drives the aileron 103a serving as the first control surface. The actuator 14b constitutes a second actuator of this embodiment that is operated by supply of pressure oil from the second aircraft central hydraulic power source 105 and that drives the aileron 103b serving as the second control surface, which is provided to be operated in pairs with the first control surface. Note that, in the following description, the aileron 103a is also referred to as the first control surface 103a, the aileron 103b is also referred to as the second control surface 103b, the actuator 14a is also referred to as the first actuator 14a, and the actuator 14b is also referred to as the second actuator 14b.

Next, the hydraulic apparatuses (13a, 13b) of the hydraulic system 1 will be described. The hydraulic apparatus 13a is configured to supply pressure oil to the first actuator 14a, and the hydraulic apparatus 13b is configured to supply pressure oil to the second actuator 14b. Although this embodiment is described, taking, as an example, a case where the hydraulic apparatuses (13a, 13b) supply pressure oil to the actuators (14a, 14b) for driving control surfaces configured as the ailerons (103a, 103b), this need not be the case. That is, the hydraulic apparatuses (13a, 13b) may be used as hydraulic apparatuses that supply pressure oil to actuators for driving control surfaces other than ailerons, such as elevators.

Figure 4:
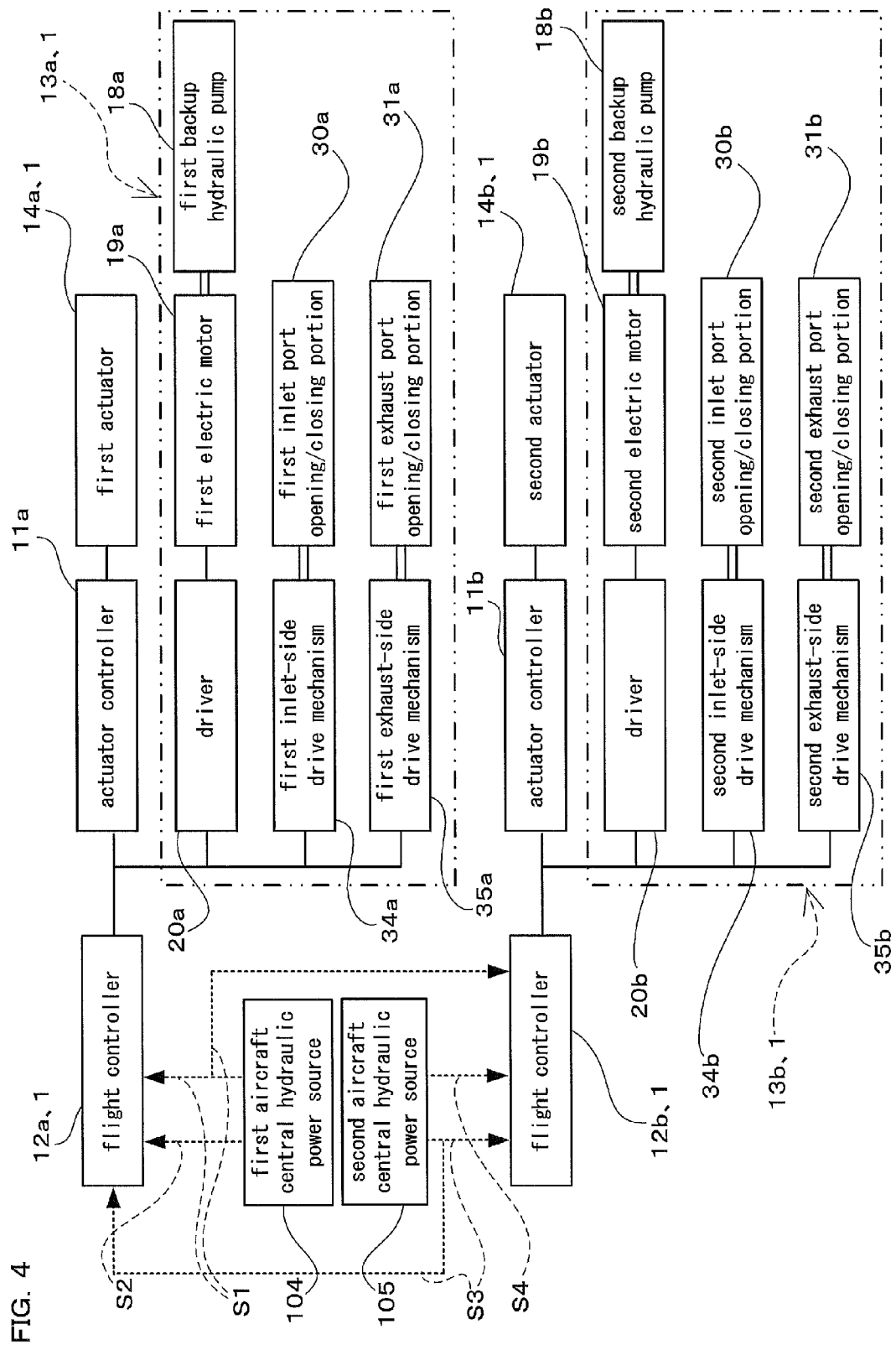
FIG. 4 is a block diagram schematically showing the aircraft actuator hydraulic system shown in FIG. 1.
Figure 5:
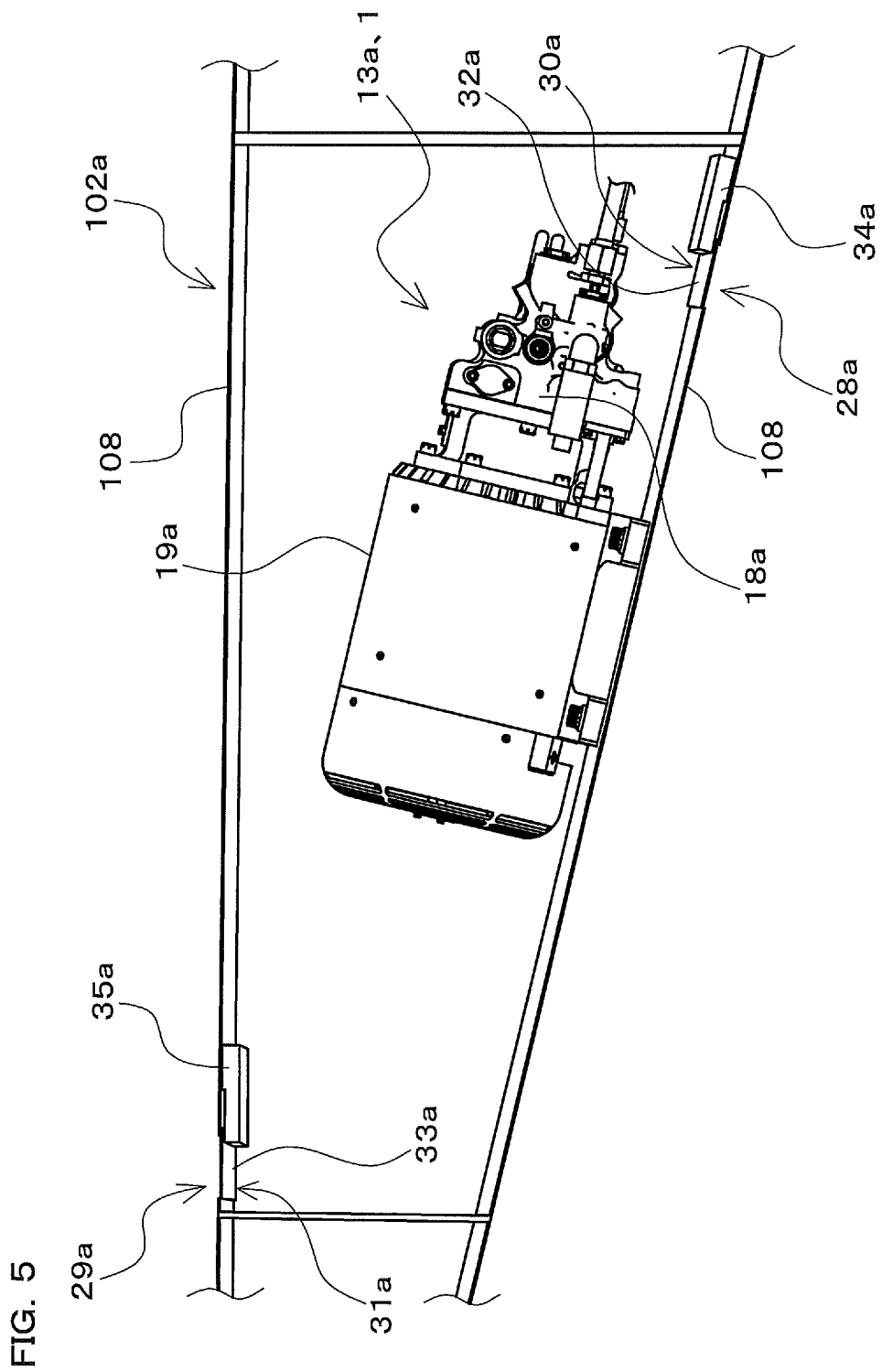
FIG. 5 is a diagram showing part of the aircraft actuator hydraulic system shown in FIG. 1 together with part of a wing, as viewed from the position of the arrows A-A.

FIG. 4 is a block diagram schematically showing the hydraulic system 1. FIG. 5 is a diagram showing the hydraulic apparatus 13a together with part of the main wing 102a, as viewed from the position of the arrows A-A in FIG. 1. Note that, in FIG. 4, the illustration of some of the constituting elements of the hydraulic system 1 is omitted. In FIG. 5, part of the main wing 102a is shown in perspective as a diagram including a cross section as viewed from the side of a first backup hydraulic pump 18a and a first electric motor 19a, which will be described below. Further, in FIG. 5, the illustration of some of the constituting elements of the hydraulic apparatus 13a is omitted, and the illustration of devices and the like other than the hydraulic apparatus 13a within the main wing 102a is omitted.

As shown in FIGS. 1 to 5, the hydraulic apparatus 13a includes the control valve 17a, the first backup hydraulic pump 18a, the first electric motor 19a, a driver 20a, a first backup-side check valve 21a, a first aircraft central hydraulic power source-side check valve 22a, a relief valve 23a, a first bypass path 24a, a first switching valve 25a, a reservoir-side bypass path 26a, a switching valve 27a, a first inlet port 28a serving as an inlet port of this embodiment, a first exhaust port 29a serving as an exhaust port of this embodiment, a first inlet port opening/closing portion 30a serving as an inlet port opening/closing portion of this embodiment, a first exhaust port opening/closing portion 31a serving as an exhaust port opening/closing portion of this embodiment, a first inlet-side drive mechanism 34a serving as an inlet-side drive mecha- nism of this embodiment, a first exhaust-side drive mechanism 35a serving as an exhaust-side drive mechanism of this embodiment, and so forth.

The control valve 17a is provided as a valve mechanism that switches the state of connection of the oil chambers (15a, 15b) of the first actuator 14a with a supply passage 104a in communication with the first aircraft central hydraulic power source 104 and an exhaust passage 106a in communication with the reservoir circuit 106. The control valve 17a may be configured, for example, as an electromagnetic switching valve, and may be driven in accordance with a command signal from an actuator controller 11a that controls operation of the first actuator 14a. Here, the control valve 17b (see FIG. 2), which is configured in the same manner as the control valve 17a, will be also described. The control valve 17b is provided as a valve mechanism that switches the state of connection of the oil chambers (15a, 15b) of the actuator 14c with a supply passage 105a in communication with the second aircraft central hydraulic power source 105 and an exhaust passage 107a in communication with the reservoir circuit 107. The control valve 17b may be configured, for example, as an electromagnetic switching valve, and may be driven in accordance with a command signal from an actuator controller 11c that controls operation of the actuator 14c.

Further, the control valve 17a is switched in accordance with a command signal from the actuator controller 11a, and thereby pressure oil is supplied from the supply passage 104a to one of the oil chambers (15a, 15b) and the oil is discharged from the other of the oil chambers (15a, 15b) to the exhaust passage 106a. Consequently, the rod 16 is displaced relative to the cylinder 15, thus driving the aileron 103a. Although not shown, a mode switching valve that switches the state (mode) of communication between the oil chambers (15a, 15b) is provided between the control valve 17a and the first actuator 14a. Note that the operation of the control valve 17b is the same as that of the control valve 17a described above, and therefore the description thereof is omitted.

The first backup hydraulic pump 18a shown in FIGS. 2 to 5 is configured as a variable capacity hydraulic pump including a swash plate. The suction side of the first backup hydraulic pump 18a is connected in communication with the exhaust passage 106a, and its discharge side is connected in communication with the supply passage 104a via the first backup-side check valve 21a so as to be able to supply pressure oil to the supply passage 104a. Also, the first backup hydraulic pump 18a is provided as a hydraulic pump that can supply pressure oil to the first actuator 14a at the occurrence of a loss or degradation in the function (pressure oil supply function) of the first aircraft central hydraulic power source 104 due to a failure of the hydraulic pump 104b, oil leakage, and the like in the first aircraft central hydraulic power source 104.

Note that the first backup-side check valve 21a described above is provided as a check valve that permits an oil flow in a direction from the first backup hydraulic pump 18a to the first actuator 14a and prevents an oil flow in the opposite direction. Further, the first aircraft central hydraulic power source-side check valve 22a is provided on the discharge side of the first backup hydraulic pump 18a in the supply passage 104a and upstream (on the first aircraft central hydraulic power source 104 side) of a location of the supply passage 104a where the downstream side of the first backup-side check valve 21a is connected. The first aircraft central hydraulic power source-side check valve 22a is provided as a check valve that permits an oil flow in a direction from the first aircraft central hydraulic power source 104 to the first actuator 14a and prevents an oil flow in the opposite direction.

Further, a relief valve 23a that discharges pressure oil into the reservoir circuit 106 when the pressure of the oil discharged from the first actuator 14a rises is provided downstream (on the reservoir circuit 106 side) of a location of the exhaust passage 106a where the suction side of the first backup hydraulic pump 18a is connected. Also, the relief valve 23a is provided with a pilot pressure chamber that is in communication with the supply passage 104a and in which a spring is disposed. When the pressure of the pressure oil supplied from the supply passage 104a decreases below a predetermined pressure value, the pressure of the pressure oil being supplied as a pilot pressure oil to the pilot pressure chamber (pilot pressure) from the supply passage 104a also decreases below a predetermined pressure value, as a result of which the exhaust passage 106a is blocked by the relief valve 23a. In this way, with the hydraulic apparatus 13a, the provision of the above-described check valves (21a, 22a) and relief valve 23a allows the pressure of the oil discharged from the first actuator 14a to be raised by the first backup hydraulic pump 18a without the oil returning to the reservoir circuit 106, and the pressure oil with an increased pressure can be supplied to the actuator 14a.

As shown in FIG. 3, the first bypass path 24a is provided as a hydraulic path that bypasses the first aircraft central hydraulic power source-side check valve 22a. The first bypass path 24a is provided as a hydraulic path that is connected with the supply passage 104a on the control valve 17a side of the first aircraft central hydraulic power source-side check valve 22a, that bypasses the first aircraft central hydraulic power source-side check valve 22a, and that is connected with the exhaust passage 106a on the reservoir circuit 106 side of the relief valve 23a. Also, the first bypass path 24a is configured as a hydraulic path for enabling circulation of oil from the first backup hydraulic pump 18a via the reservoir circuit 106 to the oil cooler 104c of the first aircraft central hydraulic power source 104, in accordance with the operation of the first switching valve 25a, which will be described below.

The first switching valve 25a shown in FIG. 3 is provided in the first bypass path 24a, for example, as an electromagnetic switching valve. The first switching valve 25a operates such that its spool position can be switched between a magnetized position and a demagnetized position, in accordance with a command signal from the flight controller 12a, which will be described below. Thereby, the first switching valve 25a is configured to be capable of switching the state of the first bypass path 24a to one of an interrupted state and a communicating state. Note that an orifice 36 is provided between the first switching valve 25a and the exhaust passage 106a in the first bypass path 24a. The provision of the orifice 36 allows the flow rate of oil circulated from the first backup hydraulic pump 18a to the oil cooler 104c via the first bypass path 24a to be reduced and adjusted when the first switching valve 25a is switched to the communicating state.

The reservoir-side bypass path 26a shown in FIG. 3 is provided as a hydraulic path that bypasses the relief valve 23a. The reservoir-side bypass path 26a is provided as a hydraulic path that is connected with the supply passage 104a on the first aircraft central hydraulic power source 104 side of the first aircraft central hydraulic power source-side check valve 22a, that bypasses the relief valve 23a, and that is connected with the exhaust passage 106a on the control valve 17a side of the relief valve 23a. Also, the reservoir-side bypass path 26a is configured as a hydraulic path that enables circulation of oil from the reservoir circuit 106 to the first backup hydraulic pump 18a via the oil cooler 104c of the first aircraft central hydraulic power source 104, in accordance with the operation of the switching valve 27a, which will be described below.

The switching valve 27a shown in FIG. 3 is provided in the reservoir-side bypass path 26a, for example, as an electromagnetic switching valve. The switching valve 27a operates such that its spool position can be switched between a magnetized position and a demagnetized position, in accordance with a command signal from the flight controller 12a, which will be described below. Thereby, the switching valve 27a is configured to be capable of switching the state of the reservoir-side bypass path 26a to one of an interrupted state and a communicating state.

The first electric motor 19a shown in FIGS. 2 to 5 is coupled to the first backup hydraulic pump 18a via a coupling or the like, and is configured to drive the first backup hydraulic pump 18a. The operational status of the first electric motor 19a is controlled via the driver 20a in accordance with a command signal from the flight controller 12a, which will be described below. Note that the driver 20a is provided as a circuit board or the like that drives the first electric motor 19a by controlling the electric power supplied to the first electric motor 19a and the running speed (rotation speed) of the first electric motor 19a in accordance with a command signal from the flight controller 12a.

Further, the first backup hydraulic pump 18a is fixed to the first electric motor 19a as shown in FIG. 5. Also, the first electric motor 19a and the first backup hydraulic pump 18a are installed inside the main wing 102a. Note that, in this embodiment, the main wing 102a constitutes the first wing 102a in which the first control surface 103a is provided (in the following description, the main wing 102a is also referred to as the first wing 102a).

As shown in FIG. 5, the first inlet port 28a is provided as a hole formed through a first wing structure portion 108 constituting the surface structure of the main wing (first wing) 102a, and is formed as a hole from which the air outside the main wing 102a can be supplied into the main wing 102a. The first inlet port 28a may be formed, for example, as a rectangular through-hole, and is installed on the undersurface side of the main wing 102a.

The first exhaust port 29a is provided as a hole formed through the first wing structure portion 108, and is formed as a hole from which the air inside the main wing 102a to the outside of the main wing 102a. The first exhaust port 29a may be formed, for example, as a rectangular through-hole, and is installed on the top surface side of the main wing 102a.

The first inlet port opening/closing portion 30a shown in FIGS. 4 and 5 is provided in the first wing structure portion 108 at a portion near the first inlet port 28a. The first inlet port opening/closing portion 30a includes a first slide lid member 32a that covers the first inlet port 28a and a slide support portion (not shown) that slidably supports the first slide lid member 32a, and is configured to be capable of opening and closing the first inlet port 28a. The first slide lid member 32a may be provided, for example, as a planar member.

The first inlet-side drive mechanism 34a shown in FIGS. 4 and 5 is configured to drive the first inlet port opening/closing portion 30a to be opened and closed by causing the first slide lid member 32a slidably supported with respect to the slide support portion of the first inlet port opening/closing portion 30a to slidably move along the first wing structure portion 108. The first inlet-side drive mechanism 34a may be configured, for example, as a drive mechanism having an electric cylinder, a drive mechanism having a linear motor, or a drive mechanism having a hydraulic cylinder. Also, the first inlet-side drive mechanism 34a is configured to operate in accordance with a command signal from the flight controller 12a, which will be described below.

Figure 6:
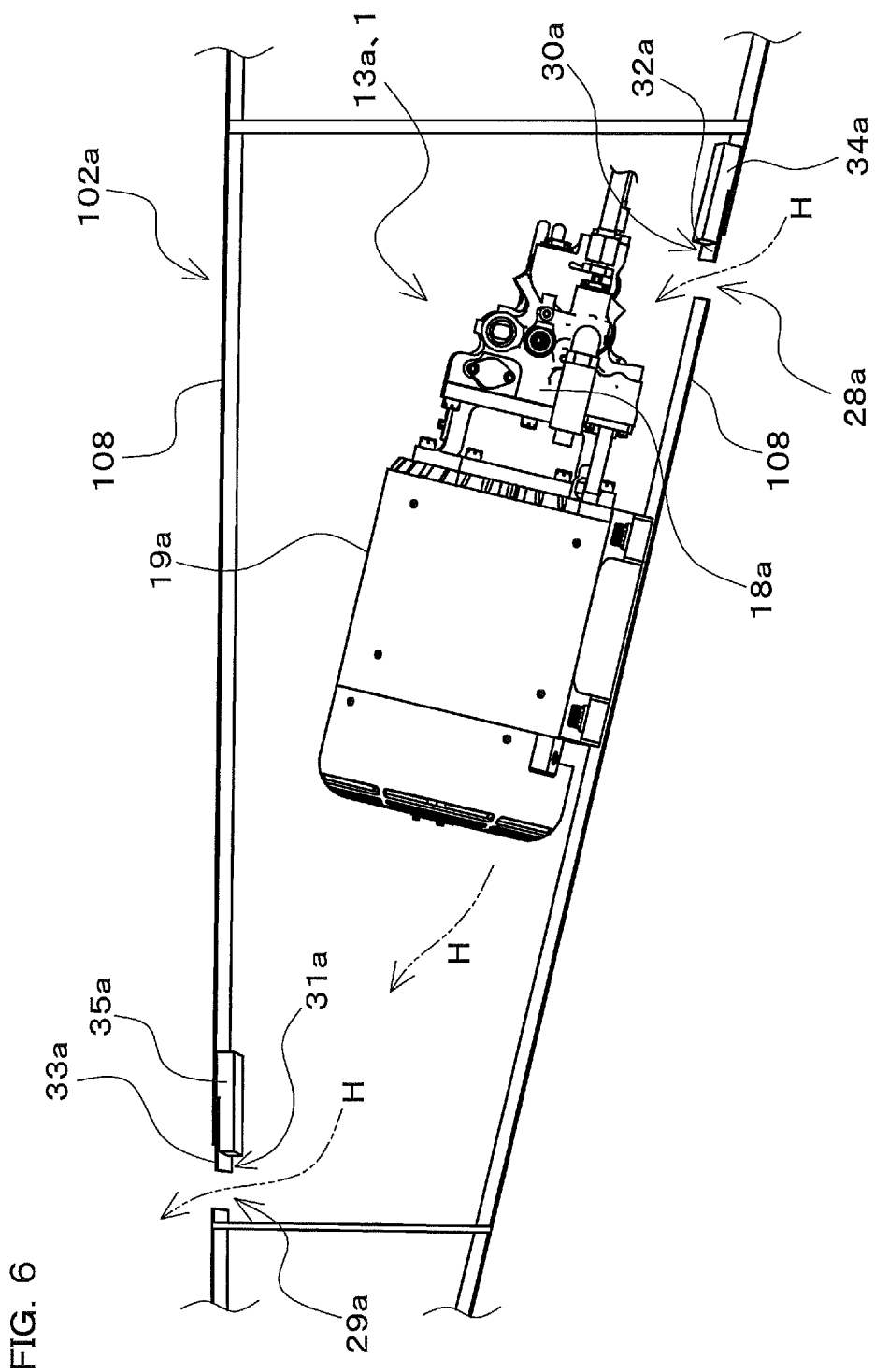
FIG. 6 is a diagram illustrating an operation of the aircraft actuator hydraulic system shown in FIG. 5.

FIG. 6 is a diagram illustrating an operation of the hydraulic apparatus 13a, corresponding to FIG. 5, and shows a state where the first inlet port opening/closing portion 30a and the first exhaust port opening/closing portion 31a, which will be described below, have opened the first inlet port 28a and the first exhaust port 29a. As shown in FIG. 6, the first inlet port opening/closing portion 30a is driven by the first inlet-side drive mechanism 34a such that the first slide lid member 32a moves so as to open the first inlet port 28a, and thereby the first inlet port opening/closing portion 30a opens the inside of the main wing 102a to the outside. On the other hand, the first inlet port opening/closing portion 30a is driven by the first inlet-side drive mechanism 34a such that the first slide lid member 32a moves so as to cover the first inlet port 28a, and thereby the first inlet port opening/closing portion 30a closes the inside of the main wing 102a from the outside. In this way, the first inlet port opening/closing portion 30a is configured such that its position can be switched between a position to open the inside of the main wing 102a to the outside and a position to close the inside of the main wing 102a from the outside by being driven by the first inlet-side drive mechanism 34a.

The first exhaust port opening/closing portion 31a shown in FIGS. 4 and 5 is provided in the first wing structure portion 108 at a portion near the first exhaust port 29a. The first exhaust port opening/closing portion 31a includes a slide lid member 33a that covers the first exhaust port 29a and a slide support portion (not shown) that slidably supports the slide lid member 33a, and is configured to be capable of opening and closing the first exhaust port 29a. The slide lid member 33a may be provided, for example, as a planar member.

The first exhaust-side drive mechanism 35a shown in FIGS. 4 and 5 is configured to drive the first exhaust port opening/closing portion 31a to be opened and closed by causing the slide lid member 33a slidably supported with respect to the slide support portion of the first exhaust port opening/closing portion 31a to slidably move along the first wing structure portion 108. The first exhaust-side drive mechanism 35a may be configured, for example, as a drive mechanism having a linear motor, a drive mechanism having an electric cylinder, or a drive mechanism having a hydraulic cylinder. Also, the second exhaust-side drive mechanism 35a is configured so as to operate in accordance with a command signal from the flight controller 12a, which will be described below.

As shown in FIG. 6, the first exhaust port opening/closing portion 31a is driven by the first exhaust-side drive mechanism 35a such that the slide lid member 33a moves so as to open the first exhaust port 29a, and thereby the first exhaust port opening/closing portion 31a opens the inside of the main wing 102a to the outside. On the other hand, the first exhaust port opening/closing portion 31a is driven by the first exhaust-side drive mechanism 35a such that the slide lid member 33a moves so as to cover the first exhaust port 29a, and thereby the first exhaust port opening/closing portion 31a closes the inside of the main wing 102a from the outside. In this way, the first exhaust port opening/closing portion 31a is configured such that its position can be switched between a position to open the inside of the main wing 102a to the outside and a position to close the inside of the main wing 102a from the outside by being driven by the first exhaust-side drive mechanism 35a.

The hydraulic apparatus 13b shown in FIGS. 1 and 4 is configured in the same manner as the hydraulic apparatus 13a described above. The hydraulic apparatus 13b includes a control valve (not shown) configured in the same manner as the control valve 17a, a second backup hydraulic pump 18b, a second electric motor 19b, a driver 20b, a second backup-side check valve (not shown), a second aircraft central hydraulic power source-side check valve (not shown), a relief valve (not shown) configured in the same manner as the relief valve 23a, a second bypass path (not shown), a second switching valve (not shown), a reservoir-side bypass path (not shown) configured in the same manner as the reservoir-side bypass path 26a, a switching valve (not shown) configured in the same manner as the switching valve 27a, a second inlet port (not shown) serving as an inlet port of this embodiment, a second exhaust port (not shown) serving as an exhaust port of this embodiment, a second inlet port opening/closing portion 30b serving as an inlet port opening/closing portion of this embodiment, a second exhaust port opening/closing portion 31b serving as an exhaust port opening/closing portion of this embodiment, a second inlet-side drive mechanism 34b serving as an inlet-side drive mechanism of this embodiment, a second exhaust-side drive mechanism 35b serving as an exhaust-side drive mechanism of this embodiment, and so forth. Note that, since the hydraulic apparatus 13b is configured in the same manner as the hydraulic apparatus 13a described above, the description of the constituent elements of the hydraulic apparatus 13b is omitted where appropriate by referring to the constituent elements of the hydraulic apparatus 13a.

The second backup hydraulic pump 18b is configured in the same manner as the first backup hydraulic pump 18a. Also, the second backup hydraulic pump 18b is provided as a hydraulic pump that can supply pressure oil to the second actuator 14b at the occurrence of a loss or degradation in the function (pressure oil supply function) of the second aircraft central hydraulic power source 105 due to a failure of the hydraulic pump, oil leakage, and the like in the second aircraft central hydraulic power source 105.

The second backup-side check valve is configured in the same manner as the first backup-side check valve 21a. Also, the second backup-side check valve is provided as a check valve that permits an oil flow in a direction from the second backup hydraulic pump 18b to the second actuator 14b and prevents an oil flow in the opposite direction. Further, the second aircraft central hydraulic power source-side check valve is configured in the same manner as the first aircraft central hydraulic power source-side check valve 22a. Also, the second aircraft central hydraulic power source-side check valve is provided as a check valve that permits an oil flow in a direction from the second aircraft central hydraulic power source 105 to the second actuator 14b and prevents an oil flow in the opposite direction.

The second bypass path is configured in the same manner as the first bypass path 24a. Also, the second bypass path is provided as a hydraulic path that bypasses the second aircraft central hydraulic power source-side check valve. The second bypass path is configured as a hydraulic path for enabling circulation of oil from the second backup hydraulic pump 18b via the reservoir circuit 107 to the oil cooler of the second aircraft central hydraulic power source 105, in accordance with the operation of the second switching valve. The second switching valve is configured in the same manner as the first switching valve 25a, and is provided in the second bypass path. Also, the second switching valve is configured to be capable of switching the state of the second bypass path to one of an interrupted state and a communicating state.

The second electric motor 19b is coupled to the second backup hydraulic pump 18b via a coupling or the like, and is configured to drive the second backup hydraulic pump 18b. The operational status of the second electric motor 19b is controlled via the driver 20b, in accordance with a command signal from the flight controller 12b, which will be described below. Note that the driver 20b is provided as a circuit board or the like that drives the second electric motor 19b by controlling the electric power supplied to the second electric motor 19b and the running speed (rotation speed) of the second electric motor 19b, in accordance with a command signal from the flight controller 12a.

Further, the second backup hydraulic pump 18b is fixed to the second electric motor 19b. The second electric motor 19b and the second backup hydraulic pump 18b are installed inside the main wing 102b. Note that, in this embodiment, the main wing 102b constitutes a second wing 102b in which the second control surface 103b is provided (in the following description, the main wing 102b is also referred to as the second wing 102b).

The second inlet port is provided as a hole formed through the second wing structure portion constituting the surface structure of the main wing (second wing) 102b, and is formed as a hole from which the air outside the main wing 102b can be supplied into the main wing 102b. Note that the second wing structure portion is configured in the same manner as the first wing structure portion 108. Also, the second inlet port is installed on the undersurface side of the main wing 102b. Further, the second exhaust port is provided as a hole formed through the second wing structure portion, and is formed as a hole from which the air inside the main wing 102b can be discharged to the outside of the main wing 102b. The second exhaust port is installed on the top surface side of the main wing 102b.

The second inlet port opening/closing portion 30b is provided in the second wing structure portion at a portion near the second inlet port. Also, the second inlet port opening/closing portion 30b includes a second slide lid member configured in the same manner as the first slide lid member 32a and covering the second inlet port and a slide support portion that slidably supports the second slide lid member, and is configured to be capable of opening and closing the second inlet port. The second inlet-side drive mechanism 34b is configured to drive the second inlet port opening/closing portion 30b to be opened and closed by causing the second slide lid member slidably supported with respect to the slide support portion of the second inlet port opening/closing portion 30b to slidably move along the second wing structure portion. The second inlet-side drive mechanism 34b may be configured, for example, as a drive mechanism having an electric cylinder, a drive mechanism having a linear motor, or a drive mechanism having a hydraulic cylinder. Also, the second inlet-side drive mechanism 34b is configured to operate in accordance with a command signal from the flight controller 12b, which will be described below. As in the hydraulic apparatus 13a, in the hydraulic apparatus 13b, the second inlet port opening/closing portion 30b is configured such that its position can be switched between a position to open the inside of the main wing 102b to the outside and a position to close the inside of the main wing 102b from the outside by being driven by the second inlet-side drive mechanism 34b.

The second exhaust port opening/closing portion 31b is provided in the second wing structure portion at a portion near the second exhaust port. Also, the second exhaust port opening/closing portion 31b includes a slide lid member configured in the same manner as the slide lid member 33a and covering the second exhaust port and a slide support portion that slidably supports the slide lid member, and is configured to be capable of opening and closing the second exhaust port. Further, the second exhaust-side drive mechanism 35b is configured to drive the second exhaust port opening/closing portion 31b to be opened and closed by causing the slide lid member slidably supported with respect to the slide support portion of the second exhaust port opening/closing portion 31b to slidably move along the second wing structure portion. The second exhaust-side drive mechanism 35b may be configured, for example, as a drive mechanism having a linear motor, a drive mechanism having an electric cylinder, or a drive mechanism having a hydraulic cylinder. Also, the second exhaust-side drive mechanism 35b is configured so as to operate in accordance with a command signal from the flight controller 12b, which will be described below. As in the hydraulic apparatus 13a, in the hydraulic apparatus 13b, the second exhaust port opening/closing portion 31b is configured such that its position can be switched between a position to open the inside of the main wing 102b to the outside and a position to close the inside of the main wing 102b from the outside by being driven by the second exhaust-side drive mechanism 35b.

Next, the flight controllers (12a, 12b) of the hydraulic system 1 will be described (see FIGS. 2 to 4). The flight controllers (12a, 12b) may include, for example, a CPU (Central Processing Unit), a memory, an interface, and so forth, which are not shown. The flight controller 12a is provided as a superordinate computer of the actuator controller 11a and the actuator controller 11c, and is configured as a computer that commands operation of the aileron 103a. Also, the flight controller 12a is configured such that a command signal for commanding operation of the aileron 103a is transmitted to the actuator controllers (11a, 11c), the actuator controllers (11a, 11c) control the first actuator 14a in accordance with the above-mentioned command signal, and thereby the operation of the aileron 103a is controlled.

On the other hand, the flight controller 12b is provided as a superordinate computer of the actuator controller 11b and an actuator controller (not shown) that controls the actuator 14d, and is configured as a computer that commands operation of the aileron 103b. Also, the flight controller 12b is configured such that a command signal for commanding operation of the aileron 103b is transmitted to the actuator controller 11b and the like, the actuator controller 11b and the like control the second actuator 14b in accordance with the above-mentioned command signal, and thereby the operation of the aileron 103b is controlled.

Here, the actuator controllers (11a, 11c) will be described briefly. The actuator controllers (11a, 11c) that control the actuators (14a, 14c) for driving the aileron 103a may be installed, for example, as controllers of a centralized control system, or controllers of a distributed processing system. In the case of the centralized control system, the actuator controller 11a and the actuator controller 11c are installed in a single casing (not shown) installed on the body 101 side, and the system is configured such that the actuator controller 11a controls the actuator 14a and the actuator controller 11c controls the actuator 14c. In the case of the distributed processing system, the actuator controller 11a is installed in a casing (not shown) mounted to the actuator 14a and the actuator controller 11c is installed in a casing (not shown) mounted to the actuator 14c, and the system is configured such that the actuator controller 11a controls the actuator 14a and the actuator controller 11c controls the actuator 14c. Although this embodiment has been described taking, as an example, a configuration in which command signals from a single flight controller 12a are input into a plurality of different actuator controllers (11a, 11c), this need not be the case. For example, it is possible to adopt a configuration in which a plurality of command signals from different flight controllers are respectively input into different actuator controllers (11a, 11c). The actuator controllers that control the actuators (14b, 14d) for driving the aileron 103b are configured in the same manner as the actuator controllers (11a, 11c), and therefore the description thereof is omitted.

As shown in FIGS. 2 to 4, the flight controller 12a, which is a superordinate computer of the actuator controller 11a, is configured to receive signals described below from the first aircraft central hydraulic power source 104 and the second aircraft central hydraulic power source 105 and be capable of transmitting a command signal to the driver 20a, the first inlet-side drive mechanism 34a, the first exhaust-side drive mechanism 35a, the first switching valve 25a, and the switching valve 27a. The flight controller 12b, which is a superordinate computer of the actuator controller 11b, is configured to receive signals described below from the first aircraft central hydraulic power source 104 and the second aircraft central hydraulic power source 105 and be capable of transmitting a command signal to the driver 20b, the second inlet-side drive mechanism 34b, the second exhaust-side drive mechanism 35b, the second switching valve, and the switching valve provided in the reservoir-side bypass path. Note that the illustration of the switching valves that operate in accordance with the command signals from the flight controllers (12a, 12b) is omitted in FIG. 4. More specifically, the illustration of the first switching valve 25a and the switching valve 27a of the hydraulic apparatus 13a, and the illustration of the second switching valve and the switching valve provided in the reservoir-side bypass path in the hydraulic apparatus 13b are omitted in FIG. 4.

A pressure detection signal S1 and a residual oil detection signal S2 are transmitted from the first aircraft central hydraulic power source 104 to the flight controller 12a, and a pressure detection signal S3 and a residual oil detection signal S4 are transmitted from the second aircraft central hydraulic power source 105 to the flight controller 12b (see FIG. 4). The pressure detection signal S1 from the first aircraft central hydraulic power source 104 is received by the flight controller 12b as well as by the flight controller 12a, and the pressure detection signal S3 from the second aircraft central hydraulic power source 105 is received by the flight controller 12a as well as by the flight controller 12b.

The pressure detection signal S1 is configured as a pressure detection signal detected by a pressure sensor (not shown) that is provided, for example, in the first aircraft central hydraulic power source 104 for detecting the discharge pressure of the first aircraft central hydraulic power source 104. Also, each of the flight controllers (12a, 12b) is configured to detect a loss or degradation in the function of the first aircraft central hydraulic power source 104 in accordance with the pressure detection signal S1. The pressure detection signal S3 is configured as a pressure detection signal detected by a pressure sensor (not shown) that is provided, for example, in the second aircraft central hydraulic power source 105 for detecting the discharge pressure of the second aircraft central hydraulic power source 105. Also, each of the flight controllers (12a, 12b) is configured to detect a loss or degradation in the function of the second aircraft central hydraulic power source 105 in accordance with the pressure detection signal S3.

For example, each of the flight controllers (12a, 12b) may be configured to detect a degradation in the function of the first aircraft central hydraulic power source 104 according to the timing at which the pressure value of the pressure detection signal S1 becomes equal to or less than a first predetermined pressure value, and detect a loss in the function of the first aircraft central hydraulic power source 104 according to the timing at which the pressure value of the pressure detection signal S1 becomes equal to or less than a predetermined second pressure value that is smaller than the first pressure value. Further, each of the flight controllers (12a, 12b) is configured to detect a degradation in the function of the second aircraft central hydraulic power source 105 according to the timing at which the pressure value of the pressure detection signal S3 becomes equal to or less than a first predetermined pressure value, and detect a loss in the function of the second aircraft central hydraulic power source 105 according to the timing at which the pressure value of the pressure detection signal S3 becomes equal to or less than a predetermined second pressure value that is smaller than the first pressure value.

The residual oil detection signal S2 is configured as an oil level detection signal (or an oil quantity detection signal) detected by an oil gauge (or an oil quantity detection sensor) that is installed, for example, in an accumulator (not shown) of the first aircraft central hydraulic power source 104. Then, the oil level in the accumulator of the first aircraft central hydraulic power source 104 is detected by the above-mentioned oil gauge, and the oil level detection signal indicating the quantity of oil remaining in a state allowing circulation in the first aircraft central hydraulic power source 104 is received by the flight controller 12a as the residual oil detection signal S2. The flight controller 12a detects the quantity of oil remaining in a state allowing circulation in the first aircraft central hydraulic power source 104 in accordance with the residual oil detection signal S2. For example, the flight controller 12a may be configured to detect a state where there is not a sufficient amount of oil remaining in the first aircraft central hydraulic power source 104 and the oil is in state not allowing circulation, if the oil level value of the residual oil detection signal S2 is less than a predetermined oil level value. On the other hand, the flight controller 12a is configured to detect a state where there is a sufficient amount of oil remaining in the first aircraft central hydraulic power source 104 and the oil is in a state allowing circulation, if the oil level value of the residual oil detection signal S2 is greater than or equal to the predetermined oil level value.

The residual oil detection signal S4 is configured as an oil level detection signal (or an oil quantity detection signal) detected by an oil gauge (or an oil quantity detection sensor) that is installed, for example, in an accumulator (not shown) of the second aircraft central hydraulic power source 105. Then, the oil level in the accumulator of the second aircraft central hydraulic power source 105 is detected by the above-mentioned oil gauge, and the oil level detection signal indicating the quantity of oil remaining in a state allowing circulation in the second aircraft central hydraulic power source 105 is received by the flight controller 12b as the residual oil detection signal S4. The flight controller 12b detects the quantity of oil remaining in a state allowing circulation in the second aircraft central hydraulic power source 105 in accordance with the residual oil detection signal S4. For example, the flight controller 12b may be configured to detect a state where there is not a sufficient amount of oil remaining in the second aircraft central hydraulic power source 105 and the oil is in state not allowing circulation, if the oil level value of the residual oil detection signal S4 is less than a predetermined oil level value. On the other hand, the flight controller 12b is configured to detect a state where there is a sufficient amount of oil remaining in the second aircraft central hydraulic power source 105 and the oil is in a state allowing circulation, if the oil level value of the residual oil detection signal S4 is greater than or equal to the predetermined oil level value.

When the flight controller 12a detects that a loss and a degradation in the function of the first aircraft central hydraulic power source 104 have not occurred and a loss or degradation in the function of the second aircraft central hydraulic power source 105 occurs, in accordance with the pressure detection signals (S1, S3), the flight controller 12a starts the operation of the first electric motor 19a via the driver 20a and performs a control so as to operate the first backup hydraulic pump 18a connected downstream of the first aircraft central hydraulic power source 104. Then, the first backup hydraulic pump 18a is operated under control of the flight controller 12a in a state where the first aircraft central hydraulic power source 104 is being operated, and thereby the oil flowing through the first backup hydraulic pump 18a and the first aircraft central hydraulic power source 104 is cooled by the oil cooler 104c of the first aircraft central hydraulic power source 104.

When the flight controller 12b detects that a loss and a degradation in the function of the second aircraft central hydraulic power source 105 have not occurred and a loss or degradation in the function of the first aircraft central hydraulic power source 104 occurs, in accordance with the pressure detection signals (S1, S3), the flight controller 12b starts the operation of the second electric motor 19b via the driver 20b and performs a control so as to operate the second backup hydraulic pump 18b connected downstream of the second aircraft central hydraulic power source 105. Then, the second backup hydraulic pump 18b is operated under control of the flight controller 12b in a state where the second aircraft central hydraulic power source 105 is being operated, and thereby the oil flowing through the second backup hydraulic pump 18b and the second aircraft central hydraulic power source 105 is cooled by the oil cooler of the second aircraft central hydraulic power source 105.

Accordingly, in the hydraulic system 1, the flight controllers (12a, 12b) constitute controllers of this embodiment that control the operation of the first backup hydraulic pump 18a and the second backup hydraulic pump 18b. In other words, the flight controllers (12a, 12b) are configured to, when a loss or degradation in the function of one of the first aircraft central hydraulic power source 104 and the second aircraft central hydraulic power source 105 occurs, performs a control so as to operate the other backup hydraulic pump, out of the first backup hydraulic pump 18a and the second backup hydraulic pump 18b, which is connected downstream of the other hydraulic power source, which is the other of the first aircraft central hydraulic power source 104 and the second aircraft central hydraulic power source 105. Also, in the hydraulic system 1, the other backup hydraulic pump is operated under control of the flight controllers (12a, 12b) in a state where the other hydraulic power source is being operated, and thereby the oil flowing through the other backup hydraulic pump and the other hydraulic power source is cooled by the oil cooler of the other hydraulic power source.

Note that the flight controllers (12a, 12b) may be configured to perform a control so as to operate the backup hydraulic pump connected downstream of the aircraft central hydraulic power source in which a loss or degradation in function occurs, in a stage when the aircraft is placed in a landing attitude in a state where the other backup hydraulic pump is being controlled to operate. For example, in a stage when the aircraft is placed in a landing attitude in a state where the second backup hydraulic pump 18b located downstream of the second aircraft central hydraulic power source 105 is being operated due to the occurrence of a loss or degradation in the function of the first aircraft central hydraulic power source 104, the flight controllers (12a, 12b) may also activate the first backup hydraulic pump 18a, and perform a control so as to operate both of the first and second backup hydraulic pumps (18a, 18b). Thereby, even if there is a sudden loss or degradation in the function of the aircraft central hydraulic power source in which no loss or degradation in function has occurred in the landing stage, the backup hydraulic pump connected downstream of the aircraft central hydraulic power source in which a loss or degradation in function occurs, in addition to the other backup hydraulic pump, is already in operation, and therefore it is possible to prevent that there is even a momentary loss of the control of the aircraft body, thus ensuring a safe flight.

Furthermore, the flight controllers (12a, 12b) cause the first backup hydraulic pump 18a and the second backup hydraulic pump 18b to operate and shift the first bypass path 24a and the reservoir-side bypass path 26a to the communicating state in accordance with the pressure detection signals (S1, S3) and the residual oil detection signal S2 when a loss or degradation in the function of the first aircraft central hydraulic power source 104 occurs and a loss or degradation in the function of the second aircraft central hydraulic power source 105 occurs in a state where oil can be circulated in the first aircraft central hydraulic power source 104. That is, in the above-described state, the flight controllers (12a, 12b) are configured to cause the first and second backup hydraulic pumps (18a, 18b) to operate and control the first switching valve 25a so as to switch the state of the first bypass path 24a to the communicating state, and control the switching valve 27a so as to switch the state of the reservoir-side bypass path 26a to the communicating state.

Also, the flight controllers (12a, 12b) cause the first backup hydraulic pump 18a and the second backup hydraulic pump 18b to operate and shift the second bypass path and the reservoir-side bypass path in the hydraulic apparatus 13b to the communicating state in accordance with the pressure detection signals (S1, S3) and the residual oil detection signal S4 when a loss or degradation in the function of the first aircraft central hydraulic power source 104 occurs and a loss or degradation in the function of the second aircraft central hydraulic power source 105 occurs in a state where oil can be circulated in the second aircraft central hydraulic power source 105. That is, in the above-described state, the flight controllers (12a, 12b) are configured to cause the first and second backup hydraulic pumps (18a, 18b) to operate, control the second switching valve so as to switch the state of the second bypass path to the communicating state in the hydraulic apparatus 13b, and control the switching valve so as to switch the state of the reservoir-side bypass path to the communicating state.

Note that the flight controllers (12a, 12b) may also be configured to cause the first backup hydraulic pump 18a and the second backup hydraulic pump 18b to operate at timing other than the above-described timing. For example, the flight controllers (12a, 12b) may cause the first backup hydraulic pump 18a and the second backup hydraulic pump 18b to operate in a stage when the aircraft is placed in a landing attitude, regardless of the pressure detection signals (S1, S3). Thereby, even if there is a sudden loss or degradation in the function of the first aircraft central hydraulic power source 104 and the second aircraft central hydraulic power source 105 in the landing stage, the first backup hydraulic pump 18a and the second backup hydraulic pump 18b are already in operation, and therefore it is possible to ensure a safe flight.

Furthermore, the flight controllers (12a, 12b) are configured to cause the drive mechanisms (34a, 34b, 35a, 35b) on the inlet side and the exhaust side to operate when activating the first backup hydraulic pump 18a and the second backup hydraulic pump 18b in the manner described above. That is, the flight controllers (12a, 12b) are configured to cause the first inlet-side drive mechanism 34a and the first exhaust-side drive mechanism 35a to operate so as to open the first inlet port 28a and the first exhaust port 29a and cause the second inlet-side drive mechanism 34b and the second exhaust-side drive mechanism 35b to operate so as to open the second inlet port and the second exhaust port, when activating both of the first and the second backup hydraulic pumps (18a, 18b).

Next, the operation of the hydraulic system 1 will be described. In a state where a loss and a degradation in the function of the first aircraft central hydraulic power source 104 and the second aircraft central hydraulic power source 105 have not occurred, the first backup hydraulic pump 18a and the second backup hydraulic pump 18b are not operated. In this state, the pressure oil from the first aircraft central hydraulic power source 104 is supplied to one of the oil chambers (15a, 15b) of the first actuator 14a via the control valve 17a. The oil is discharged from the other of the oil chambers (15a, 15b) and is returned to the reservoir circuit 106 via the control valve 17a. In the same manner, the pressure oil from the second aircraft central hydraulic power source 105 is supplied to the second actuator 14b, and the oil is discharged from the second actuator 14b and is returned to the reservoir circuit. Further, switching between the oil chambers (15a, 15b) to which pressure oil is supplied and from which the oil is discharged is performed by switching the state of connection of the control valve 17a in accordance with a command signal from the actuator controller 11a, as a result of which the first actuator 14a is operated to drive the aileron 103a. In the same manner, the second actuator 14b is operated to drive the aileron 103b.

On the other hand, when a loss and a degradation in the function of only the first aircraft central hydraulic power source 104 occur, the second backup hydraulic pump 18b connected downstream of the second aircraft central hydraulic power source 105 is operated, as described above. That is, the second aircraft central hydraulic power source 105 and the second backup hydraulic pump 18b are operated in parallel. Then, the pressure oil from the second backup hydraulic pump 18b and the second aircraft central hydraulic power source 105 is supplied to the second actuator 14b. A portion of the oil discharged from the second actuator 14b is sucked in by the second backup hydraulic pump 18b and thus the pressure of the oil is raised, and the remaining oil is returned to the reservoir circuit 107. Consequently, the aileron 103b is driven and also the oil flowing through the second backup hydraulic pump 18b and the second aircraft central hydraulic power source 105 is cooled by the oil cooler of the second aircraft central hydraulic power source 105.

When a loss and a degradation in the function of only the second aircraft central hydraulic power source 105 occur, the first backup hydraulic pump 18a connected downstream of the first aircraft central hydraulic power source 104 is operated, as described above. That is, the first aircraft central hydraulic power source 104 and the first backup hydraulic pump 18a are operated in parallel. Then, the pressure oil from the first backup hydraulic pump 18a and the first aircraft central hydraulic power source 104 is supplied to the first actuator 14a. A portion of the oil discharged from the first actuator 14a is sucked in by the first backup hydraulic pump 18a and thus the pressure of the oil is raised, and the remaining oil is returned to the reservoir circuit 106. Consequently, the aileron 103a is driven and also the oil flowing through the first backup hydraulic pump 18a and the first aircraft central hydraulic power source 104 is cooled by the oil cooler 104c of the first aircraft central hydraulic power source 104.

When a loss or degradation in the function of both of the first aircraft central hydraulic power source 104 and the second aircraft central hydraulic power source 105 occurs, the first backup hydraulic pump 18a and the second backup hydraulic pump 18b are operated in parallel. Note that, stochastically, it is extremely rare that a loss or degradation in the function occur in both of the first aircraft central hydraulic power source 104 and the second aircraft central hydraulic power source 105. Even in the occurrence of such a rare case, the operation of one of the first backup hydraulic pump 18a and the second backup hydraulic pump 18b is usually started in a state where the other is already in operation.

At the time of operating the first and second backup hydraulic pumps (18a, 18b) when a loss or degradation in the function of both of the first and second aircraft central hydraulic power sources (104, 105) occurs in a state where oil can be circulated in the first aircraft central hydraulic power source 104, the first switching valve 25a and the switching valve 27a are operated, and the first bypass path 24a and the reservoir-side bypass path 26a are switched to the communicating state. Consequently, at least a portion of the oil discharged from the first backup hydraulic pump 18a is steadily circulated in the oil cooler 104c of the first aircraft central hydraulic power source 104, and thereby the oil is cooled. At this time, in the first aircraft central hydraulic power source 104, a hydraulic circuit (not shown) is switched such that the oil is circulated through the oil cooler 104c without passing through the hydraulic pump 104b, in accordance with a command signal from the flight controller 12a.

At the time of operating the first and second backup hydraulic pumps (18a, 18b) when a loss or degradation in the function of both of the first and second aircraft central hydraulic power sources (104, 105) occurs in a state where oil can be circulated in the second aircraft central hydraulic power source 105, the second switching valve and the switching valve for the reservoir-side bypass path in the hydraulic apparatus 13b are operated, and the second bypass path and the reservoir-side bypass path are switched to the communicating state. Consequently, at least a portion of the oil discharged from the second backup hydraulic pump 18b is steadily circulated in the oil cooler of the second aircraft central hydraulic power source 105, and thereby the oil is cooled. At this time, in the second aircraft central hydraulic power source 105, a hydraulic circuit (not shown) is switched such that the oil is circulated through the oil cooler without passing through the hydraulic pump in the second aircraft central hydraulic power source 105, in accordance with a command signal from the flight controller 12b.

In a state where a loss and a degradation in the function of any of the first and second aircraft central hydraulic power sources (104, 105) have not occurred, or in a state where a loss and a degradation in the function of only one of the first and second aircraft central hydraulic power sources (104, 105) occur, the inlet port opening/closing portions (30a, 30b) and the exhaust port opening/closing portions (31a, 31b) cover the respective inlet ports and the respective exhaust ports. That is, in the above-described states, the first inlet port opening/closing portion 30a covers the first inlet port 28a at the first slide lid member 32a and the first exhaust port opening/closing portion 31a covers the first exhaust port 29a at the slide lid member 33a, as a result of which the inside of the main wing 102a is closed from the outside. In the same manner, the second inlet port opening/closing portion 30b covers the second inlet port and the second exhaust port opening/closing portion 31b covers the second exhaust port, as a result of which the inside of the main wing 102b is closed from the outside.

On the other hand, at the timing at which a loss or degradation in the function of both of the first and second aircraft central hydraulic power sources (104, 105) occurs and both of the first and second backup hydraulic pumps (18a, 18b) are activated, the first and second inlet-side drive mechanisms (34a, 34b) and the first and second exhaust-side drive mechanisms (35a, 35b) are operated in accordance with command signals from the flight controllers (12a, 12b). Then, the first inlet port opening/closing portion 30a is driven by the first inlet-side drive mechanism 34a such that the first slide lid member 32a slidably moves, and the first exhaust port opening/closing portion 31a is driven by the first exhaust-side drive mechanism 35a such that the slide lid member 33a slidably moves. Consequently, the first inlet port 28a is opened, and the first exhaust port 29a is opened. Likewise, the second inlet port and the second exhaust port are opened.

Opening the first inlet port 28a allows the air outside the main wing 102a to flow in from the first inlet port 28a installed on the undersurface side of the main wing 102a, which is the high-pressure side in the main wing 102a. Also, opening the first exhaust port 29a allows the air inside the main wing 102a to flow out from the first exhaust port 29a installed on the top surface side of the main wing 102a, which is the low-pressure side in the main wing 102a. In this way, air flows of the low-temperature air outside the main wing 102a flowing into the main wing 102a from the first inlet port 28a and of the air inside the main wing 102a flowing out from the first exhaust port 29a to the outside are formed. That is, air flows as indicated by the arrows H shown by the two-dot chain lines in FIG. 6 are formed. Note that, in the main wing 102b as well, opening the second inlet port and the second exhaust port forms the same air flows as described above.

The heat generated in the first backup hydraulic pump 18a, the first electric motor 19a, and the oil being used is conducted to the air inside the first wing structure portion 108 by heat conduction, heat transmission (convection), and heat radiation. Then, the heat conducted to the air inside the first wing structure portion 108 is removed to the outside of the main wing 102a, along with the above-described air flows of the air outside the main wing 102a flowing in from the first inlet port 28a and of the air inside the main wing 102a flowing out from the first exhaust port 29a (the air flows indicated by the arrows H shown by the two-dot chain lines). In other words, the low-temperature air outside the main wing 102a is supplied into the main wing 102a, and the high-temperature air inside the main wing 102a is discharged to the outside of the main wing 102a. Consequently, the first backup hydraulic pump 18a, the first electric motor 19a, and the oil being used are cooled via the air flowing in from the first inlet port 28a through the inside of the first wing structure portion 108 to the first exhaust port 29a, thus suppressing an increase in the temperature of these components. Note that, in the main wing 102b as well, the second backup hydraulic pump 18b, the second electric motor 19b, and the oil being used are cooled via the air flowing in from the second inlet port through the inside of the second wing structure portion to the second exhaust port in the same manner as described above, thus suppressing an increase in the temperature of these components.

It is preferable that the flight controllers (12a, 12b) are configured to cause the drive mechanisms (34a, 34b, 35a, 35b) on the inlet side and the exhaust side to operate so as to open the inlet ports and the exhaust ports when both of the first and second backup hydraulic pumps (18a, 18b) are activated in a state where oil cannot be circulated in at least one of the first and second aircraft central hydraulic power sources (104, 105). Alternatively, it is preferable that the flight controllers (12a, 12b) are configured to cause the drive mechanisms (34a, 34b, 35a, 35b) on the inlet side and the exhaust side to operate so as to open the inlet ports and the exhaust ports when both of the first and second backup hydraulic pumps (18a, 18b) are activated in a state where oil cannot be circulated in both of the first and second aircraft central hydraulic power sources (104, 105). In these cases, the inlet ports and the exhaust ports remain closed without being opened when both of the first and second backup hydraulic pumps (18a, 18b) are activated in a state where cooling can be performed by the respective oil coolers of the first and second aircraft central hydraulic power sources (104, 105) or in a state where cooling can be performed by the oil cooler of one of the first and second aircraft central hydraulic power sources (104, 105). Therefore, it is possible to suppress an increase in the overall temperature of the system and an increase in the oil temperature, while preventing the reduction of the wing efficiency by decreasing the frequency of opening or eliminating the need of opening the inlet ports and the exhaust ports when the oil coolers of the aircraft central hydraulic power source (104, 105) can be effectively utilized.

As described thus far, with the hydraulic system 1, even if a loss or degradation in the function of the first aircraft central hydraulic power source 104 occurs after a loss or degradation in the function of the second aircraft central hydraulic power source 105 occurred, the first actuator 14a can be driven by supply of the pressure oil from the first backup hydraulic pump 18a. Also, even if a loss or degradation in the function of the second aircraft central hydraulic power source 105 occurs after a loss or degradation in the function of the first aircraft central hydraulic power source 104 occurred, the second actuator 14b can be driven by supply of the pressure oil from the second backup hydraulic pump 18b.

Furthermore, with the hydraulic system 1, when a loss or degradation in the function of one of the first and second aircraft central hydraulic power sources (104, 105) occurs, the other backup hydraulic pump (18a or 18b), which is connected downstream of the other of the first and second aircraft central hydraulic power sources (104, 105) (i.e., the other hydraulic power source, in which a loss or degradation in the function has not occurred) is operated under control of the flight controllers (12a, 12b). The oil flowing through the other backup hydraulic pump (18a or 18b) and the other hydraulic power source (104 or 105) is cooled by the oil cooler of the other hydraulic power source (104 or 105) by operation of the other backup hydraulic pump (18a or 18b) in a state where the other hydraulic power source (104 or 105) is being operated. Therefore, even if the other backup hydraulic pump (18a or 18b), which is operated when a loss or degradation in the function of one of the first and second aircraft central hydraulic power sources (104, 105) occurs, is continuously operated, it is possible to cool the oil (working fluid) that is supplied as the pressure oil from the other backup hydraulic pump (18a or 18b) to the actuator (14a or 14b) and is circulated between that pump and the actuator. Then, it is possible to cool the other backup hydraulic pump (18a or 18b) in operation, and also cool the electric motor (19a or 19b) that is coupled to the other backup hydraulic pump (18a or 18b) and in which heat conduction occurs, thus making it possible to suppress an increase in the overall temperature of the hydraulic system 1. Furthermore, with the hydraulic system 1, it is possible to continuously maintain the control of the aircraft body by the backup hydraulic pump that has already been activated even if a loss in the function of the remaining aircraft central hydraulic power source (i.e., even if a loss or degradation in the function also occurs in the aircraft central hydraulic power source in which a loss or degradation in the function has not occurred) occurs, while suppressing the temperature increase.

As described above, according to this embodiment, it is possible to effectively utilize the oil coolers of the aircraft central hydraulic power sources (104, 105), thus suppressing an increase in the temperature of the backup hydraulic pumps (18a, 18b) and the oil used. According to this embodiment, an oil cooler for cooling oil will not be further added to the hydraulic system 1, which functions in the case of a loss or degradation of the function of the aircraft central hydraulic power sources (104, 105), and therefore there will be no increase in the size and the weight of the hydraulic system 1.

Therefore, according to this embodiment, it is possible to provide a hydraulic system 1 for aircraft actuators that can drive the actuators (14a, 14b) even in the case of a loss or degradation in the function of the aircraft central hydraulic power sources (104, 105) and can prevent an increase in the size and the weight of the system, thus suppressing an increase in the overall temperature of the system and the temperature of the oil used.

With the hydraulic system 1, the provision of the first backup-side check valve 21a and the first aircraft central hydraulic power source-side check valve 22a prevents a backflow of the pressure oil from the first backup hydraulic pump 18a to the first aircraft central hydraulic power source 104 and a backflow of the pressure oil from the first aircraft central hydraulic power source 104 to the first backup hydraulic pump 18a during operation of the first backup hydraulic pump 18a and the first aircraft central hydraulic power source 104. Also, the provision of the second backup-side check valve and the second aircraft central hydraulic power source-side check valve prevents a backflow of the pressure oil from the second backup hydraulic pump 18b to the second aircraft central hydraulic power source 105 and a backflow of the pressure oil from the second aircraft central hydraulic power source 105 to the second backup hydraulic pump 18b during operation of the second backup hydraulic pump 18b and the second aircraft central hydraulic power source 105.

Furthermore, with the hydraulic system 1, the first and second actuators (14a, 14b) are driven by operation of the first and second backup hydraulic pumps (18a, 18b) when a loss or degradation in the function of the first and second aircraft central hydraulic power sources (104, 105) occurs. Also, if the oil can be circulated in the first aircraft central hydraulic power source 104 in the case of a loss or degradation in the function of the first and second aircraft central hydraulic power sources (104, 105), the flight controller 12a controls the first switching valve 25a provided in the first bypass path 24a so as to switch the state of the first bypass path 24a that bypasses the first aircraft central hydraulic power source-side check valve 22a to the communicating state. Consequently, the oil supplied from the first backup hydraulic pump 18a is cooled by being circulated also in the oil cooler 104c of the first aircraft central hydraulic power source 104. Further, if the oil can be circulated in the second aircraft central hydraulic power source 105 in the case of a loss or degradation in the function of the first and second aircraft central hydraulic power sources (104, 105), the flight controller 12b controls the second switching valve provided in the second bypass path so as to switch the sate of the second bypass path that bypasses the second aircraft central hydraulic power source-side check valve to the communicating state. Consequently, the oil supplied from the second backup hydraulic pump 18b is cooled by being circulated also in the oil cooler of the second aircraft central hydraulic power source 105. Accordingly, it is possible to drive the first and second actuators (14a, 14b) even in the case of a loss or degradation in the function of both of the first and second aircraft central hydraulic power sources (104, 105) and effectively utilize the oil coolers of the aircraft central hydraulic power sources (104, 105), thus suppressing an increase in the temperature of the backup hydraulic pumps (18a, 18b) and the temperature of the oil used.

With the hydraulic system 1, the first backup hydraulic pump 18a and the first electric motor 19a are installed inside the first wing 102a, and the second backup hydraulic pump 18b and the second electric motor 19b are installed inside the second wing 102b. Accordingly, the hydraulic system 1 for aircraft actuators is installed in a region close to the actuators (14a, 14b), making it possible to realize a further reduction in the size and the weight of the hydraulic system 1. Moreover, with the hydraulic system 1, the first inlet port opening/closing portion 30a and the first exhaust port opening/closing portion 31a operate to open the first inlet port 28a and the first exhaust port 29a, thus making it possible to supply the low-temperature air outside the first wing 102a into the first wing 102a and discharge the high-temperature air inside the first wing 102a to the outside of the first wing 102a. Likewise, the second inlet port opening/closing portion 30b and the second exhaust port opening/closing portion 31b operate to open the second inlet port and the second exhaust port, thus making it possible to supply the low-temperature air outside the second wing 102b into the second wing 102b and discharge the high-temperature air inside the second wing 102b to the outside of the second wing 102b. Accordingly, the heat generated from the first and second backup hydraulic pumps (18a, 18b) and the first and second electric motors (19a, 19b) of the hydraulic system 1 can be removed by the air flowing in from the first inlet port 28a to the first exhaust port 29a and the air flowing in from the second inlet port to the second exhaust port, thereby cooling the hydraulic system 1. That is, the heat generated in the hydraulic system 1 can be released directly to the atmosphere outside the first and second wings (102a, 102b).

With the hydraulic system 1, the inlet ports and the exhaust ports are opened if both of the first and second backup hydraulic pumps (18a, 18b) are activated when a loss or degradation in the function of both of the first and second aircraft central hydraulic power sources (104, 105) occurs. Therefore, even in such a case where the oil coolers of the aircraft central hydraulic power sources (104, 105) cannot be used when a loss or degradation in the function of both of the first and second aircraft central hydraulic power sources (104, 105) occurs, it is possible to suppress an increase in the overall temperature of the hydraulic system 1 and an increase in the temperature of the oil used. Furthermore, with the hydraulic system 1, the inlet-side drive mechanisms (34a, 34b) that drive the inlet port opening/closing portions (30a, 30b) to be opened and closed and the exhaust-side drive mechanisms (35a, 35b) that drive the exhaust port opening/closing portions (31a, 31b) to be opened and closed operate in accordance with command signals from the flight controllers (12a, 12b) that control the operation of the first and second backup hydraulic pumps (18a, 18b). Accordingly, it is possible, by effectively utilizing the flight controllers (12a, 12b) that control the operation of the first and second backup hydraulic pumps (18a, 18b), to achieve a control configuration that can open the inlet ports and the exhaust ports in response to the operation status of the first and second backup hydraulic pumps (18a, 18b), without adding an extra control apparatus.

Although the actuator 14a is described as the first actuator 14a, the actuator 14b as the second actuator 14b, the aircraft central hydraulic power source 104 as the first aircraft central hydraulic power source 104, and the aircraft central hydraulic power source 105 as the second aircraft central hydraulic power source 105 in this embodiment, the terms "first" and "second" are interchangeable. That is, a configuration in which the actuator 14a is described as the second actuator 14a, the actuator 14b as the first actuator 14b, the aircraft central hydraulic power source 104 as the second aircraft central hydraulic power source 104, and the aircraft central hydraulic power source 105 as the first aircraft central hydraulic power source 105 can achieve the same effect as the invention. In the case where the terms "first" and "second" are interchanged in the above-described embodiments, the terms "first" and "second" are interchanged also for the constituent elements such as the backup hydraulic pumps, the electric motors.

Second Embodiment

Figure 7:
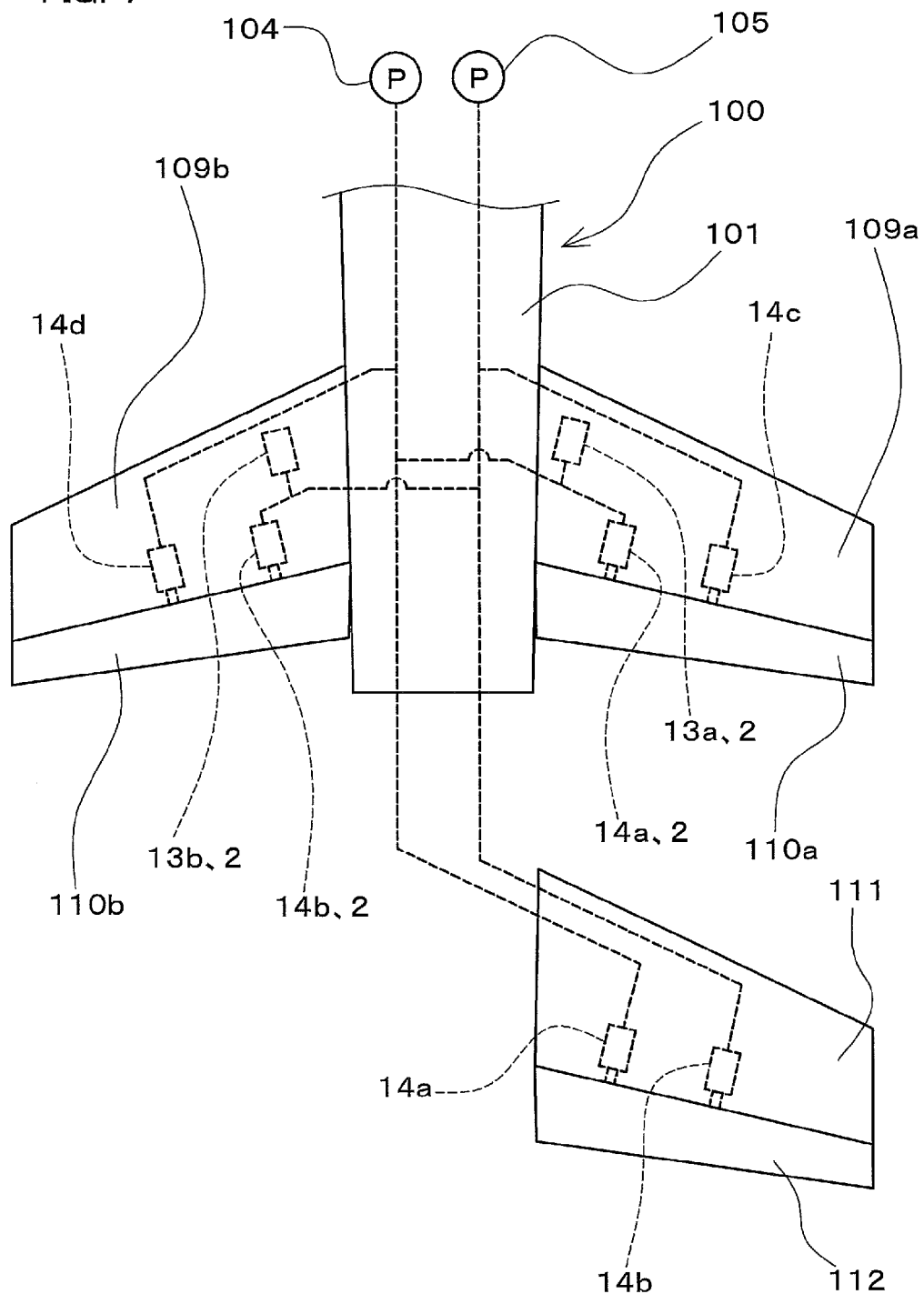
FIG. 7 is a diagram schematically showing part of an aircraft to which an aircraft actuator hydraulic system according to a second embodiment of the present invention is applied.
Figure 8:
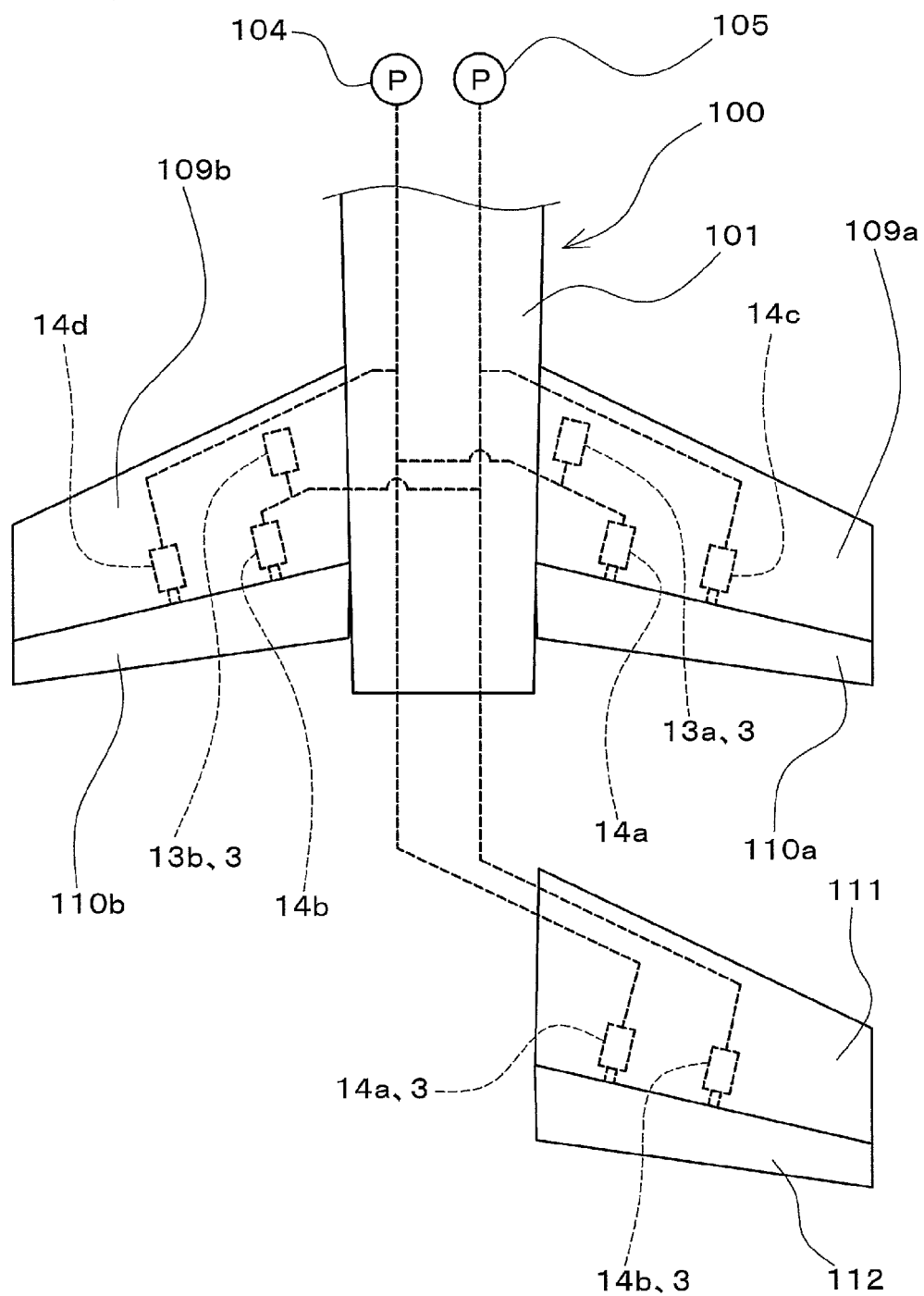
FIG. 8 is a diagram schematically showing part of an aircraft to which an aircraft actuator hydraulic system according to the second embodiment of the present invention is applied.

Next, a hydraulic system 2 (hereinafter, also simply referred to as a "hydraulic system 2") for aircraft actuators and a hydraulic system 3 for aircraft actuators (hereinafter, also simply referred to as a "hydraulic system 3") according to a second embodiment of the present invention will be described. FIGS. 7 and 8 are schematic diagrams showing part of an aircraft 100 to which the hydraulic system 2 and the hydraulic system 3 are applied, showing a rear part of a body 101 of the aircraft 100, a pair of tailplanes (109a, 109b), and a vertical tail 111. Note that the vertical tail 111 is schematically shown as being separated from the body 101.

The hydraulic system 2 shown in FIG. 7 includes a first actuator 14a and a second actuator 14b, hydraulic apparatuses (13a, 13b), and flight controllers (12a, 12b) (not shown), as with the hydraulic system 1 of the first embodiment. However, the configuration of the hydraulic system 2 is different from that of the hydraulic system 1 of the first embodiment in that the first actuator 14a is configured as an actuator that drives an elevator 110a serving as a first control surface provided in the tailplane 109a and the second actuator 14b is configured as an actuator that drives an elevator 110b serving as a second control surface provided in the tailplane 109b.

The hydraulic system 3 shown in FIG. 8 includes a first actuator 14a and a second actuator 14b, hydraulic apparatuses (13a, 13b), and flight controllers (12a, 12b) (not shown), as with the hydraulic system 1 of the first embodiment. However, the configuration of the hydraulic system 3 is different from that of the hydraulic system 1 of the first embodiment in that the first actuator 14a is configured as an actuator that drives a rudder 112 serving as a first control surface provided in the vertical tail 111 and the second actuator 14b is also configured as an actuator that drives the rudder 112 serving as the first control surface provided in the vertical tail 111.

In the following description of the hydraulic system 2 and the hydraulic system 3, the differences in configuration from the first embodiment will be described. The description of the detailed configuration of those elements configured in the same manner as in the first embodiment, i.e., the detailed configuration of the first and second actuators (14a, 14b), the hydraulic apparatuses (13a, 13b), the flight controllers (12a, 12b), the first and second aircraft central hydraulic power sources (104, 105), and so forth is omitted by using the same reference numerals in the drawings, or by referring to the same reference numerals.

The hydraulic system 2 and the hydraulic system 3 are configured to share the hydraulic apparatuses (13a, 13b). That is, the first backup hydraulic apparatus 18a of the hydraulic apparatus 13a and the second backup hydraulic apparatus 18b of the hydraulic apparatus 13b constitute elements of the hydraulic system 2 and also constitute elements of the hydraulic system 3. Note that the control valves for switching between the supply and the discharge of the pressure oil to and from the actuators (14a, 14b) are provided, respectively corresponding to the actuators (14a, 14b) of the hydraulic system 2 and the actuators (14a, 14b) of the hydraulic system 3. Further, as described above, the rudder 112 serving as the first control surface is configured to be driven by the first actuator 14a and the second actuator 14b in the hydraulic system 3.

When a loss and a degradation in the function of only the first aircraft central hydraulic power source 104 occur in the hydraulic system 2 and the hydraulic system 3, the second backup hydraulic pump 18b of the hydraulic apparatus 13b that is connected downstream of the second aircraft central hydraulic power source 105 is operated. That is, the second aircraft central hydraulic power source 105 and the second backup hydraulic pump 18b are operated in parallel. Then, the pressure oil from the second backup hydraulic pump 18b and the second aircraft central hydraulic power source 105 is supplied to the second actuator 14b. A portion of the oil discharged from the second actuator 14b is sucked in by the second backup hydraulic pump 18b and thus the pressure of the oil is raised, and the remaining oil is returned to the reservoir circuit 107. Consequently, the elevator 110b and the rudder 112 are driven and also the oil flowing through the second backup hydraulic pump 18b and the second aircraft central hydraulic power source 105 is cooled by the oil cooler of the second aircraft central hydraulic power source 105.

When a loss and a degradation in the function of only the second aircraft central hydraulic power source 105 occur in the hydraulic system 2 and the hydraulic system 3, the first backup hydraulic pump 18a of the hydraulic apparatus 13a that is connected downstream of the first aircraft central hydraulic power source 104 is operated. That is, the first aircraft central hydraulic power source 104 and the first backup hydraulic pump 18a are operated in parallel. Then, the pressure oil from the first backup hydraulic pump 18a and the first aircraft central hydraulic power source 104 is supplied to the first actuator 14a. A portion of the oil discharged from the first actuator 14a is sucked in by the first backup hydraulic pump 18a and thus the pressure of the oil is raised, and the remaining oil is returned to the reservoir circuit 106. Consequently, the elevator 110a and the rudder 112 are driven and also the oil flowing through the first backup hydraulic pump 18a and the first aircraft central hydraulic power source 104 is cooled by the oil cooler 104c of the first aircraft central hydraulic power source 104.

When a loss or degradation in the function of both of the first aircraft central hydraulic power source 104 and the second aircraft central hydraulic power source 105 occurs, the first backup hydraulic pump 18a of the hydraulic apparatus 13a and the second backup hydraulic pump 18b of the hydraulic apparatus 13b are operated. In this case, when oil can be circulated in the first aircraft central hydraulic power source 104, the first switching valve 25a and the switching valve 27a of the hydraulic apparatus 13a are operated, and the first bypass path 24a and the reservoir-side bypass path 26a are switched to the communicating state. Consequently, at least a portion of the oil discharged from the first backup hydraulic pump 18a is steadily circulated in the oil cooler 104c of the first aircraft central hydraulic power source 104, and thereby the oil is cooled. At the time of operating the first and second backup hydraulic pumps (18a, 18b) in a state where oil can be circulated in the second aircraft central hydraulic power source 105, the second switching valve and the switching valve for the reservoir-side bypass path in the hydraulic apparatus 13b are operated, and the second bypass path and the reservoir-side bypass path are switched to the communicating state. Consequently, at least a portion of the oil discharged from the second backup hydraulic pump 18b is steadily circulated in the oil cooler of the second aircraft central hydraulic power source 105, and thereby the oil is cooled.

In the hydraulic system 2, the first backup hydraulic pump 18a and the first electric motor 19a are installed inside the tailplane 109a. Also, as with the main wing 102a of the first embodiment, the tailplane 109a is provided with a first inlet port 28a, a first exhaust port 29a, a first inlet port opening/closing portion 30a, a first exhaust port opening/closing portion 31a, a first inlet-side drive mechanism 34a, and a first exhaust-side drive mechanism 35a. On the other hand, the second backup hydraulic pump 18b and the second electric motor 19b are installed inside the tailplane 109b. Also, as with the main wing 102b of the first embodiment, the tailplane 109b is provided with a second inlet port, a second exhaust port, a second inlet port opening/closing portion 30b, a second exhaust port opening/closing portion 31b, a second inlet-side drive mechanism 34b, and a second exhaust-side drive mechanism 35b. As with the first embodiment, the first and second inlet-side drive mechanisms (34a, 34b) and the first and second exhaust-side drive mechanisms (35a, 35b) are operated in accordance with command signals from the flight controllers (12a, 12b), and thereby the first inlet port 28a, the second inlet port, the first exhaust port 29a, and the second exhaust port are controlled to be opened and closed.

According to this embodiment described thus far, it is possible to achieve the same effect as the first embodiment. That is, according to this embodiment, it is possible to provide a hydraulic system 2 for aircraft actuators and a hydraulic system 3 for aircraft actuators that can drive the actuators (14a, 14b) even in the case of a loss or degradation in the function of the aircraft central hydraulic power sources (104, 105) and can prevent an increase in the size and the weight of the system, thus suppressing an increase in the overall temperature of the system and the temperature of the oil used. Furthermore, according to this embodiment, the first and second backup hydraulic pumps (18a, 18b) and the first and second electric motors (19a, 19b) are shared by the hydraulic system 2 and the hydraulic system 3, and thereby the constituent elements can be streamlined. This makes it possible to realize a reduction in the size and the weight of the overall system of the aircraft 100.

Although this embodiment has been described, taking, as an example, a configuration in which the first and second backup hydraulic pumps (18a, 18b) and the first and second electric motors (19a, 19b) are shared by the hydraulic system 2 and the hydraulic system 3 and are installed inside the tailplanes (109a, 109b), this need not be the case. It is possible to adopt a configuration in which the first and second backup hydraulic pumps (18a, 18b) and the first and second electric motors (19a, 19b) are installed inside the vertical tail 111, regardless of whether they are shared with the hydraulic system 2.

Although embodiments of the present invention have been described thus far, the present invention is not limited to the above-described first and second embodiments, and various modifications may be made within the scope recited in the claims. For example, it is possible to implement an aircraft actuator hydraulic system that includes an actuator for driving a control surface other than an aileron, an elevator, and a rudder, and that supplies pressure oil to the actuator. Further, various modifications can be made for the configuration of the hydraulic circuit that connects the aircraft actuator hydraulic system with the aircraft central hydraulic power sources. The configuration of the controllers that control the operation of the first and second backup hydraulic pumps is not limited to those illustrated in the first and second embodiments, and various modifications may be made. The configuration of the first bypass path, the second bypass path, the first switching valve, and the second switching valve is not limited to a circuit configuration and a valve configuration illustrated in the first embodiment, and various modifications may be made. Various modifications can be made for the arrangement and the shape of the inlet port and the exhaust port. Various modifications can also be made for the configuration of the inlet port opening/closing portion, the exhaust port opening/closing portion, the inlet-side drive mechanism, and the exhaust-side drive mechanism. The inlet port opening/closing portion and the exhaust port opening/closing portion may be configured such that, once they are opened during a flight of the aircraft, they can be kept open until the aircraft makes a landing.

Although the above-described embodiments have been described, taking, as an example, a configuration in which the first and second inlet ports are provided as inlet ports and the first and second exhaust ports are provided as exhaust ports, this need not be the case. The inlet port may be provided in at least one of the first wing structure portion and the second wing structure portion. The exhaust port may be provided in at least one of the first wing structure portion and the second wing structure portion in which the inlet port is provided. The inlet port opening/closing portion may be provided in at least one of the first wing structure portion and the second wing structure portion in which the inlet port is provided. The exhaust port opening/closing portion may be provided in at least one of the first wing structure portion and the second wing structure portion in which the exhaust port is provided.

The present invention can be widely used as an aircraft actuator hydraulic system that includes hydraulically operated actuators for driving control surfaces of an aircraft and that supplies pressure oil to the actuators.

The present invention is not limited to the above-described embodiments, and all modifications, applications and equivalents thereof that fall within the claims, for which modifications and applications would become apparent by reading and understanding the present specification, are intended to be embraced therein.

What is claimed is:

1. An aircraft actuator hydraulic system that includes hydraulically operated actuators for driving control surfaces of an aircraft and that supplies pressure oil to the actuators, the system comprising:
   a first actuator that is provided as one of the actuators and that drives a first control surface provided as one of the control surfaces by being operated by supply of pressure oil from a first aircraft central hydraulic power source with an oil cooler;
   a second actuator that is provided as another one of the actuators and that drives a second control surface provided as another one of the control surfaces and provided so as to operate in pairs with the first control surface or that drives the first control surface by being operated by supply of pressure oil from a second aircraft central hydraulic power source with an oil cooler;
   a first backup hydraulic pump that can supply pressure oil to the first actuator when a loss or degradation in a function of the first aircraft central hydraulic power source occurs;
   a second backup hydraulic pump that can supply pressure oil to the second actuator when a loss or degradation in a function of the second aircraft central hydraulic power source occurs; and
   a controller that, when a loss or degradation in the function of one of the first aircraft central hydraulic power source and the second aircraft central hydraulic power source occurs, performs a control so as to operate the other backup hydraulic pump, out of the first backup hydraulic pump and the second backup hydraulic pump, which is connected downstream of the other hydraulic power source, which is the other of the first aircraft central hydraulic power source and the second aircraft central hydraulic power source, wherein oil flowing through the other backup hydraulic pump and the other hydraulic power source is cooled by the oil cooler of the other hydraulic power source by operation of the other backup hydraulic pump under control of the controller in a state where the other hydraulic power source is being operated.

2. The aircraft actuator hydraulic system according to claim 1, further comprising:

a first backup-side check valve that permits an oil flow in a direction from the first backup hydraulic pump to the first actuator and prevents an oil flow in the opposite direction;

a first aircraft central hydraulic power source-side check valve that permits an oil flow in a direction from the first aircraft central hydraulic power source to the first actuator and prevents an oil flow in the opposite direction;

a second backup-side check valve that permits an oil flow in a direction from the second backup hydraulic pump to the second actuator and prevents an oil flow in the opposite direction;

a second aircraft central hydraulic power source-side check valve that permits an oil flow in a direction from the second aircraft central hydraulic power source to the second actuator and prevents an oil flow in the opposite direction;

a first bypass path that bypasses the first aircraft central hydraulic power source-side check valve and enables circulation of oil from the first backup hydraulic pump to the oil cooler of the first aircraft central hydraulic power source;

a second bypass path that bypasses the second aircraft central hydraulic power source-side check valve and enables circulation of oil from the second backup hydraulic pump to the oil cooler of the second aircraft central hydraulic power source;

a first switching valve that can switch a state of the first bypass path to one of a communicating state and an interrupted state; and a second switching valve that can switch a state of the second bypass path to one of a communicating state and an interrupted state, wherein the controller causes the first backup hydraulic pump and the second backup hydraulic pump to operate and controls the first switching valve so as to switch the state of the first bypass path to the communicating state, when a loss or degradation in the function of the first aircraft central hydraulic power source occurs and a loss or degradation in the function of the second aircraft central hydraulic power source occurs in a state where oil can be circulated in the first aircraft central hydraulic power source; and causes the first backup hydraulic pump and the second backup hydraulic pump to operate and controls the second switching valve so as to switch the state of the second bypass path to the communicating state, when a loss or degradation in the function of the first aircraft central hydraulic power source occurs and a loss or degradation in the function of the second aircraft central hydraulic power source occurs in a state where oil can be circulated in the second aircraft central hydraulic power source.

3. The aircraft actuator hydraulic system according to claim 1, wherein the first backup hydraulic pump and a first electric motor that drives the first backup hydraulic pump are installed inside a first wing provided with the first control surface, the second backup hydraulic pump and a second electric motor that drives the second backup hydraulic pump are installed inside a second wing provided with the second control surface driven by the second actuator, the hydraulic system further comprises:

an inlet port that is provided as a hole formed through at least one of a first wing structure portion constituting a surface structure of the first wing and a second wing structure portion constituting a surface structure of the second wing, and that can supply air outside the first wing and the second wing into at least one of the first wing and the second wing;

an exhaust port that is provided as a hole formed through at least one of the first wing structure portion and the second wing structure portion in which the inlet port is provided, and that can discharge air inside at least one of the first wing and the second wing to the outside;

an inlet port opening/closing portion that is provided in at least one of the first wing structure portion and the second wing structure portion in which the inlet port is provided, whose position can be switched between a position to open the inside of at least one of the first wing and the second wing to the outside and a position to close the inside of at least one of the first wing and the second wing from the outside, and that can open and close the inlet port;

an exhaust port opening/closing portion that is provided in at least one of the first wing structure portion and the second wing structure portion in which the exhaust port is provided, whose position can be switched between a position to open the inside of at least one of the first wing and the second wing to the outside and a position to close the inside of at least one of the first wing and the second wing from the outside, and that can open and close the exhaust port;

an inlet-side drive mechanism that drives the inlet port opening/closing portion to be opened and closed; and an exhaust-side drive mechanism that drives the exhaust port opening/closing portion to be opened and closed, wherein the inlet-side drive mechanism and the exhaust-side drive mechanism operate in accordance with a command signal from the controller, and the controller causes the inlet-side drive mechanism and the exhaust-side drive mechanism to operate so as to open the inlet port and the exhaust port when activating both of the first backup hydraulic pump and the second backup hydraulic pump.

* * * * *